(12) United States Patent
Ledenev et al.

(10) Patent No.: US 8,482,153 B2
(45) Date of Patent: Jul. 9, 2013

(54) SYSTEMS FOR OPTIMIZED SOLAR POWER INVERSION

(75) Inventors: Anatoli Ledenev, Fort Collins, CO (US); Robert M. Porter, Wellington, CO (US)

(73) Assignee: AMPT, LLC, Fort Collins, CO (US)

( * ) Notice: Subject to any disclaimer, the term of this patent is extended or adjusted under 35 U.S.C. 154(b) by 0 days.

(21) Appl. No.: 13/275,147

(22) Filed: Oct. 17, 2011

(65) Prior Publication Data

US 2012/0032515 A1 Feb. 9, 2012

Related U.S. Application Data

(63) Continuation of application No. 13/192,329, filed on Jul. 27, 2011, which is a continuation of application No. 12/955,704, filed on Nov. 29, 2010, now Pat. No. 8,004,116, which is a continuation of application No. 12/682,889, filed as application No. PCT/US2008/057105 on Mar. 14, 2008, now Pat. No. 7,843,085.

(60) Provisional application No. 60/980,157, filed on Oct. 15, 2007, provisional application No. 60/982,053, filed on Oct. 23, 2007, provisional application No. 60/986,979, filed on Nov. 9, 2007.

(51) Int. Cl.
*H02J 1/00* (2006.01)

(52) U.S. Cl.
USPC ................................ 307/63; 307/64; 700/286

(58) Field of Classification Search
USPC ........................ 307/64, 63; 700/286
See application file for complete search history.

(56) References Cited

U.S. PATENT DOCUMENTS

| | | | |
|---|---|---|---|
| 3,900,943 | A | 8/1975 | Sirti et al. |
| 4,127,797 | A | 11/1978 | Perper |
| 4,168,124 | A | 9/1979 | Pizzi |
| 4,218,139 | A | 8/1980 | Sheffield |

(Continued)

FOREIGN PATENT DOCUMENTS

| | | |
|---|---|---|
| EP | 0677749 A3 | 1/1996 |
| EP | 0677749 A2 | 10/1996 |

(Continued)

OTHER PUBLICATIONS

U.S. Appl. No. 12/363,709; First Amended Accelerated Examination Support Document filed Jul. 15, 2009.

(Continued)

*Primary Examiner* — Hal Kaplan
(74) *Attorney, Agent, or Firm* — Santangelo Law Offices, P.C.

(57) ABSTRACT

The DC-AC inversion of solar power in systems having high voltage, highly varying photovoltaic power sources may be provided to optimize input into a high voltage, high power photovoltaic DC-AC inverter. The inverter may coordinate the conversion of solar power in photovoltaic DC-DC power converters to achieve a desired inverter operating condition. Desired inverter operating conditions may include singular voltage inputs, optimal voltage inputs, inverter sweet spot voltage inputs, and the like. The converters may be coordinated to convert output to optimal input characteristics of the inverter, to control a posterior photovoltaic operating condition, to control the converter for inverter operating conditions, and the like. Output from the inverter may be transferred to a power grid at high power levels with coordinated control possible for various elements.

19 Claims, 10 Drawing Sheets

U.S. PATENT DOCUMENTS

| | | | |
|---|---|---|---|
| 4,222,665 A | 9/1980 | Tachizawa et al. |
| 4,249,958 A | 2/1981 | Baudin et al. |
| 4,274,044 A | 6/1981 | Barre |
| 4,341,607 A | 7/1982 | Tison |
| 4,375,662 A | 3/1983 | Baker |
| 4,390,940 A | 6/1983 | Corbefin et al. |
| 4,395,675 A | 7/1983 | Toumani |
| 4,404,472 A | 9/1983 | Steigerwald |
| 4,409,537 A | 10/1983 | Harris |
| 4,445,030 A | 4/1984 | Carlson |
| 4,445,049 A | 4/1984 | Steigerwald |
| 4,513,167 A | 4/1985 | Brandstetter |
| 4,528,503 A | 7/1985 | Cole |
| 4,580,090 A | 4/1986 | Bailey et al. |
| 4,581,716 A | 4/1986 | Kamiya |
| 4,619,863 A | 10/1986 | Taylor |
| 4,626,983 A | 12/1986 | Harada et al. |
| 4,649,334 A | 3/1987 | Nakajima |
| 4,725,740 A | 2/1988 | Nakata |
| 4,749,982 A | 6/1988 | Rikuna et al. |
| 4,794,909 A | 1/1989 | Eiden |
| 4,873,480 A | 10/1989 | Lafferty |
| 4,896,034 A | 1/1990 | Kiriseko |
| 4,899,269 A | 2/1990 | Rouzies |
| 4,922,396 A | 5/1990 | Niggemeyer |
| 5,027,051 A | 6/1991 | Lafferty |
| 5,028,861 A | 7/1991 | Pace et al. |
| 5,179,508 A | 1/1993 | Lange et al. |
| 5,270,636 A | 12/1993 | Lafferty |
| 5,401,561 A | 3/1995 | Fisun et al. |
| 5,493,155 A | 2/1996 | Okamoto et al. |
| 5,493,204 A | 2/1996 | Caldwell |
| 5,503,260 A | 4/1996 | Riley |
| 5,646,502 A | 7/1997 | Johnson |
| 5,648,731 A | 7/1997 | Decker et al. |
| 5,659,465 A | 8/1997 | Flack et al. |
| 5,669,987 A | 9/1997 | Takehara et al. |
| 5,689,242 A | 11/1997 | Sims et al. |
| 5,741,370 A | 4/1998 | Hanoka |
| 5,747,967 A | 5/1998 | Muljadi et al. |
| 5,782,994 A | 7/1998 | Mori et al. |
| 5,896,281 A | 4/1999 | Bingley |
| 5,898,585 A | 4/1999 | Sirichote et al. |
| 5,923,100 A | 7/1999 | Lukens et al. |
| 5,932,994 A | 8/1999 | Jo et al. |
| 6,046,401 A | 4/2000 | McCabe |
| 6,081,104 A | 6/2000 | Kern |
| 6,124,769 A | 9/2000 | Igarashi et al. |
| 6,162,986 A | 12/2000 | Shiotsuka |
| 6,180,868 B1 | 1/2001 | Yoshino et al. |
| 6,181,590 B1 | 1/2001 | Yamane et al. |
| 6,191,501 B1 | 2/2001 | Bos |
| 6,218,605 B1 | 4/2001 | Dally et al. |
| 6,218,820 B1 | 4/2001 | D'Arrigo et al. |
| 6,219,623 B1 | 4/2001 | Wills |
| 6,262,558 B1 | 7/2001 | Weinberg |
| 6,278,052 B1 | 8/2001 | Takehara et al. |
| 6,281,485 B1 | 8/2001 | Siri |
| 6,282,104 B1 | 8/2001 | Kern |
| 6,314,007 B2 | 11/2001 | Johnson, Jr. et al. |
| 6,331,670 B2 | 12/2001 | Takehara et al. |
| 6,351,400 B1 | 2/2002 | Lumsden |
| 6,369,462 B1 | 4/2002 | Siri |
| 6,433,522 B1 | 8/2002 | Siri |
| 6,433,992 B2 | 8/2002 | Nakagawa et al. |
| 6,441,896 B1 | 8/2002 | Field |
| 6,448,489 B2 | 9/2002 | Kimura et al. |
| 6,493,246 B2 | 12/2002 | Suzui et al. |
| 6,515,215 B1 | 2/2003 | Mimura |
| 6,545,211 B1 | 4/2003 | Mimura |
| 6,545,868 B1 | 4/2003 | Kledzik et al. |
| 6,593,521 B2 | 7/2003 | Kobayashi |
| 6,624,350 B2 | 9/2003 | Nixon et al. |
| 6,670,721 B2 | 12/2003 | Lof et al. |
| 6,686,533 B2 | 2/2004 | Raum et al. |
| 6,686,727 B2 | 2/2004 | Ledenev et al. |
| 6,703,555 B2 | 3/2004 | Takabayashi et al. |
| 6,750,391 B2 | 6/2004 | Bower et al. |
| 6,791,024 B2 | 9/2004 | Toyomura |
| 6,804,127 B2 | 10/2004 | Zhou |
| 6,889,122 B2 | 5/2005 | Perez |
| 6,914,418 B2 | 7/2005 | Sung |
| 6,920,055 B1 | 7/2005 | Zeng et al. |
| 6,952,355 B2 | 10/2005 | Rissio et al. |
| 6,958,922 B2 | 10/2005 | Kazem |
| 6,984,965 B2 | 1/2006 | Vinciarelli |
| 6,984,970 B2 | 1/2006 | Capel |
| 7,019,988 B2 | 3/2006 | Fung et al. |
| 7,046,531 B2 | 5/2006 | Zocchi et al. |
| 7,068,017 B2 | 6/2006 | Willner et al. |
| 7,072,194 B2 | 7/2006 | Nayar et al. |
| 7,091,707 B2 | 8/2006 | Cutler |
| 7,092,265 B2 | 8/2006 | Kernahan |
| 7,158,395 B2 | 1/2007 | Deng et al. |
| 7,193,872 B2 | 3/2007 | Siri |
| 7,227,278 B2 | 6/2007 | Realmuto et al. |
| 7,248,946 B2 | 7/2007 | Bashaw et al. |
| 7,274,975 B2 | 9/2007 | Miller |
| 7,333,916 B2 | 2/2008 | Warfield et al. |
| 7,339,287 B2 * | 3/2008 | Jepsen et al. ................ 307/82 |
| 7,365,661 B2 | 4/2008 | Thomas |
| 7,471,073 B2 | 12/2008 | Rettenwort et al. |
| 7,479,774 B2 | 1/2009 | Wai et al. |
| 7,514,900 B2 | 4/2009 | Sander et al. |
| D602,432 S | 10/2009 | Moussa |
| 7,602,080 B1 | 10/2009 | Hadar et al. |
| 7,605,498 B2 | 10/2009 | Ledenev et al. |
| 7,619,200 B1 | 11/2009 | Seymour et al. |
| 7,619,323 B2 * | 11/2009 | Tan et al. ................... 307/82 |
| 7,719,140 B2 | 5/2010 | Ledenev et al. |
| 7,786,716 B2 | 8/2010 | Simburger et al. |
| 7,807,919 B2 | 10/2010 | Powell |
| 7,919,953 B2 | 4/2011 | Porter et al. |
| 7,948,221 B2 | 5/2011 | Watanabe et al. |
| 7,962,249 B1 | 6/2011 | Zhang et al. |
| 8,004,116 B2 | 8/2011 | Ledenev et al. |
| 8,093,756 B2 | 1/2012 | Porter et al. |
| 8,106,765 B1 | 1/2012 | Ackerson et al. |
| 8,242,634 B2 | 8/2012 | Schatz et al. |
| 8,304,932 B2 | 11/2012 | Ledenev et al. |
| 2001/0007522 A1 | 7/2001 | Nakagawa et al. |
| 2001/0032664 A1 | 10/2001 | Takehara et al. |
| 2002/0195136 A1 | 12/2002 | Takabayashi et al. |
| 2003/0062078 A1 | 4/2003 | Mimura |
| 2003/0075211 A1 | 4/2003 | Makita et al. |
| 2003/0117822 A1 | 6/2003 | Stamenic et al. |
| 2004/0095020 A1 | 5/2004 | Kernahan et al. |
| 2004/0100149 A1 | 5/2004 | Lai |
| 2004/0135560 A1 | 7/2004 | Kernahan et al. |
| 2004/0159102 A1 | 8/2004 | Toyomura et al. |
| 2004/0164557 A1 | 8/2004 | West |
| 2004/0207366 A1 | 10/2004 | Sung |
| 2004/0211456 A1 | 10/2004 | Brown et al. |
| 2005/0002214 A1 | 1/2005 | Deng et al. |
| 2005/0068012 A1 | 3/2005 | Cutler |
| 2005/0105224 A1 | 5/2005 | Nishi |
| 2005/0109386 A1 | 5/2005 | Marshall |
| 2005/0121067 A1 | 6/2005 | Toyomura |
| 2005/0162018 A1 | 7/2005 | Realmuto et al. |
| 2005/0169018 A1 | 8/2005 | Hatai et al. |
| 2005/0254191 A1 | 11/2005 | Bashaw et al. |
| 2006/0017327 A1 | 1/2006 | Siri et al. |
| 2006/0103360 A9 | 5/2006 | Cutler |
| 2006/0162772 A1 | 7/2006 | Preser et al. |
| 2006/0171182 A1 | 8/2006 | Siri et al. |
| 2006/0174939 A1 | 8/2006 | Matan |
| 2007/0024257 A1 | 2/2007 | Boldo |
| 2007/0035975 A1 | 2/2007 | Dickerson et al. |
| 2007/0044837 A1 | 3/2007 | Simburger et al. |
| 2007/0069520 A1 | 3/2007 | Schetters |
| 2007/0111103 A1 | 5/2007 | Konishiike et al. |
| 2007/0119718 A1 | 5/2007 | Gibson et al. |
| 2007/0133241 A1 | 6/2007 | Mumtaz et al. |
| 2007/0159866 A1 | 7/2007 | Siri |
| 2007/0165347 A1 | 7/2007 | Wendt et al. |
| 2007/0171680 A1 | 7/2007 | Perreault et al. |
| 2007/0236187 A1 | 10/2007 | Wai et al. |

| | | | | | | |
|---|---|---|---|---|---|---|
| 2008/0036440 A1 | 2/2008 | Garmer | EP | 0964457 A3 | 12/1999 | |
| 2008/0062724 A1 | 3/2008 | Feng et al. | EP | 00978884 A3 | 3/2000 | |
| 2008/0097655 A1 | 4/2008 | Hadar et al. | EP | 0780750 B1 | 3/2002 | |
| 2008/0101101 A1 | 5/2008 | Iwata et al. | EP | 1120895 A3 | 5/2004 | |
| 2008/0111517 A1 | 5/2008 | Pfeifer et al. | FR | 612859 | 11/1948 | |
| 2008/0123375 A1 | 5/2008 | Beardsley | GB | 310362 | 9/1929 | |
| 2008/0136367 A1 | 6/2008 | Adest et al. | GB | 1231961 | 9/1969 | |
| 2008/0143188 A1 | 6/2008 | Adest et al. | GB | 5050197 | 11/2005 | |
| 2008/0144294 A1 | 6/2008 | Adest et al. | GB | 2415841 A | 1/2006 | |
| 2008/0147335 A1* | 6/2008 | Adest et al. ............. 702/64 | GB | 2419968 A | 5/2006 | |
| 2008/0150366 A1 | 6/2008 | Adest et al. | GB | 2421847 A | 7/2006 | |
| 2008/0164766 A1 | 7/2008 | Adest et al. | GB | 2434490 A | 7/2007 | |
| 2008/0186004 A1 | 8/2008 | Williams | JP | 56042365 A2 | 4/1981 | |
| 2008/0236648 A1 | 10/2008 | Klein et al. | JP | 60027964 A2 | 2/1985 | |
| 2008/0238195 A1 | 10/2008 | Shaver | JP | 60148172 A2 | 8/1985 | |
| 2008/0247201 A1 | 10/2008 | Perol | JP | 62154121 A2 | 9/1987 | |
| 2008/0257397 A1 | 10/2008 | Glaser et al. | JP | 05003678 A2 | 1/1993 | |
| 2009/0039852 A1 | 2/2009 | Fishelov et al. | JP | 06035555 A2 | 2/1994 | |
| 2009/0078300 A1 | 3/2009 | Ang et al. | JP | 06141261 A2 | 5/1994 | |
| 2009/0114263 A1 | 5/2009 | Powell et al. | JP | 07026849 U2 | 1/1995 | |
| 2009/0120485 A1 | 5/2009 | Kikinis | JP | 07222436 A2 | 8/1995 | |
| 2009/0133736 A1 | 5/2009 | Powell et al. | JP | 08033347 A2 | 2/1996 | |
| 2009/0140715 A1 | 6/2009 | Adest et al. | JP | 8046231 A | 2/1996 | |
| 2009/0141522 A1 | 6/2009 | Adest et al. | JP | 08066050 A2 | 3/1996 | |
| 2009/0145480 A1 | 6/2009 | Adest et al. | JP | 08181343 A2 | 7/1996 | |
| 2009/0146505 A1 | 6/2009 | Powell et al. | JP | 08204220 A2 | 8/1996 | |
| 2009/0146667 A1 | 6/2009 | Adest et al. | JP | 09097918 A2 | 4/1997 | |
| 2009/0146671 A1 | 6/2009 | Gazit | JP | 9148613 A2 | 6/1997 | |
| 2009/0147554 A1 | 6/2009 | Adest et al. | JP | 2000020150 A2 | 1/2000 | |
| 2009/0155005 A1 | 6/2009 | Hadar et al. | JP | 20011086765 A | 3/2001 | |
| 2009/0160258 A1 | 6/2009 | Allen et al. | JP | 2002231578 A | 8/2002 | |
| 2009/0206666 A1 | 8/2009 | Sella et al. | JP | 2002231578 A2 | 8/2002 | |
| 2009/0207543 A1 | 8/2009 | Boniface et al. | JP | 2007104872 A | 4/2007 | |
| 2009/0218887 A1 | 9/2009 | Ledenev et al. | JP | 2007625625 A | 6/2007 | |
| 2009/0234692 A1 | 9/2009 | Powell et al. | JP | 27058845 A | 8/2007 | |
| 2009/0237042 A1 | 9/2009 | Glovinski | JP | 2007058843 A | 8/2007 | |
| 2009/0273241 A1 | 11/2009 | Gazit et al. | KR | 1020050071689 A | 7/2005 | |
| 2009/0283128 A1 | 11/2009 | Zhang et al. | KR | 1020060060825 A | 7/2006 | |
| 2009/0283129 A1 | 11/2009 | Foss | KR | 1020070036528 A9 | 3/2007 | |
| 2009/0284078 A1 | 11/2009 | Zhang et al. | KR | 1020080092747 A | 10/2008 | |
| 2009/0284232 A1 | 11/2009 | Zhang et al. | WO | 90/03680 | 4/1990 | |
| 2009/0284240 A1 | 11/2009 | Zhang et al. | WO | 9003680 A1 | 4/1990 | |
| 2009/0284998 A1 | 11/2009 | Zhang et al. | WO | 2011049985 A1 | 4/2001 | |
| 2010/0001587 A1 | 1/2010 | Casey et al. | WO | 02073785 A1 | 9/2002 | |
| 2010/0026097 A1 | 2/2010 | Avrutsky et al. | WO | 03036688 A2 | 4/2003 | |
| 2010/0027297 A1 | 2/2010 | Avrutsky et al. | WO | 2004100344 A2 | 11/2004 | |
| 2010/0038968 A1 | 2/2010 | Ledenev et al. | WO | 2004100348 A1 | 11/2004 | |
| 2010/0078057 A1 | 4/2010 | Karg et al. | WO | 2004107543 A1 | 12/2004 | |
| 2010/0085670 A1 | 4/2010 | Palaniswami et al. | WO | 2005027300 A1 | 3/2005 | |
| 2010/0117858 A1 | 5/2010 | Rozenboim | WO | 2005036725 A1 | 4/2005 | |
| 2010/0118985 A1 | 5/2010 | Rozenboim | WO | 2005076445 A1 | 8/2005 | |
| 2010/0127570 A1 | 5/2010 | Hadar et al. | WO | 2006005125 A1 | 1/2006 | |
| 2010/0127571 A1 | 5/2010 | Hadar et al. | WO | 2006013600 A2 | 2/2006 | |
| 2010/0132758 A1 | 6/2010 | Gilmore | WO | 2006013600 A3 | 2/2006 | |
| 2010/0139732 A1 | 6/2010 | Hadar et al. | WO | 2006048688 A1 | 5/2006 | |
| 2010/0139734 A1 | 6/2010 | Hadar et al. | WO | 2006048689 A2 | 5/2006 | |
| 2010/0139743 A1 | 6/2010 | Hadar et al. | WO | 2006048689 A3 | 5/2006 | |
| 2010/0195361 A1 | 8/2010 | Stem | WO | 2006071436 A2 | 7/2006 | |
| 2010/0229915 A1 | 9/2010 | Ledenev | WO | 2006078685 A2 | 7/2006 | |
| 2010/0246230 A1 | 9/2010 | Porter | WO | 2006090675 | 8/2006 | |
| 2010/0253150 A1 | 10/2010 | Porter et al. | WO | 2006117551 A2 | 11/2006 | |
| 2010/0308662 A1 | 12/2010 | Schatz et al. | WO | 2006137948 A2 | 12/2006 | |
| 2011/0005567 A1 | 1/2011 | VanderSluis et al. | WO | 2007007360 A2 | 1/2007 | |
| 2011/0095613 A1 | 4/2011 | Huang et al. | WO | 2007008429 A2 | 7/2007 | |
| 2011/0115300 A1 | 5/2011 | Chiang et al. | WO | 2007080429 A2 | 7/2007 | |
| 2011/0127841 A1 | 6/2011 | Chiang et al. | WO | 2007142693 A3 | 12/2007 | |
| 2011/0160930 A1 | 6/2011 | Batten et al. | WO | 2008125915 A2 | 10/2008 | |
| 2011/0175454 A1 | 7/2011 | Williams et al. | WO | 2008125915 A3 | 10/2008 | |
| 2011/0181251 A1 | 7/2011 | Porter et al. | WO | 2008132551 A2 | 11/2008 | |
| 2011/0193515 A1 | 8/2011 | Wu et al. | WO | 2008132551 A3 | 11/2008 | |
| 2011/0210611 A1 | 9/2011 | Ledenev et al. | WO | 2008132553 A2 | 11/2008 | |
| 2011/0316346 A1 | 12/2011 | Porter et al. | WO | 2008142480 A2 | 11/2008 | |
| 2012/0175963 A1* | 7/2012 | Adest et al. ............. 307/82 | WO | 2008142480 A3 | 11/2008 | |
| 2012/0223584 A1 | 9/2012 | Ledenev et al. | WO | 2008142480 A4 | 11/2008 | |
| | | | WO | 2008069926 A3 | 12/2008 | |
| | FOREIGN PATENT DOCUMENTS | | WO | 2009007782 A2 | 1/2009 | |
| EP | 0824273 A2 | 2/1998 | WO | 2009007782 A3 | 1/2009 | |
| EP | 0964415 A1 | 12/1999 | WO | 2009007782 A4 | 1/2009 | |
| EP | 0964457 A2 | 12/1999 | WO | 2009051853 A1 | 4/2009 | |

| | | | |
|---|---|---|---|
| WO | 2009051854 A1 | 4/2009 |
| WO | 2009051870 A1 | 4/2009 |
| WO | 2009055474 A1 | 4/2009 |
| WO | 2009059028 A2 | 5/2009 |
| WO | 2009059028 A3 | 5/2009 |
| WO | 2009064683 A2 | 5/2009 |
| WO | 2009064683 A3 | 5/2009 |
| WO | 2009072075 A2 | 6/2009 |
| WO | 2009072075 A3 | 6/2009 |
| WO | 2009072075 A9 | 6/2009 |
| WO | 2009072076 A2 | 6/2009 |
| WO | 2009072076 A3 | 6/2009 |
| WO | 2009072077 A1 | 6/2009 |
| WO | 2009073867 A1 | 6/2009 |
| WO | 2009073868 A1 | 6/2009 |
| WO | 2009075985 A2 | 6/2009 |
| WO | 2009075985 A3 | 6/2009 |
| WO | 2009114341 A2 | 9/2009 |
| WO | 2009114341 A3 | 9/2009 |
| WO | 2009118682 A2 | 10/2009 |
| WO | 2009118682 A3 | 10/2009 |
| WO | 2009118682 A4 | 10/2009 |
| WO | 2009118683 A2 | 10/2009 |
| WO | 2009118683 A3 | 10/2009 |
| WO | 2009118683 A4 | 10/2009 |
| WO | 2009136358 A1 | 11/2009 |
| WO | 2009136358 A4 | 11/2009 |
| WO | 2009140536 A2 | 11/2009 |
| WO | 2009140536 A3 | 11/2009 |
| WO | 2009140539 A2 | 11/2009 |
| WO | 2009140539 A3 | 11/2009 |
| WO | 2009140543 A2 | 11/2009 |
| WO | 2009140543 A3 | 11/2009 |
| WO | 2009140551 A2 | 11/2009 |
| WO | 2009140551 A3 | 11/2009 |
| WO | 2010002960 A1 | 1/2010 |
| WO | 2010014116 A1 | 2/2010 |
| WO | 2010062410 A1 | 6/2010 |
| WO | 2010062662 A2 | 6/2010 |
| WO | 2010062662 A3 | 6/2010 |
| WO | 2010065043 A1 | 6/2010 |
| WO | 2010120315 A1 | 10/2010 |
| WO | 2012100263 A2 | 7/2012 |

OTHER PUBLICATIONS

U.S. Appl. No. 12/363,709, Accelerated Examination Support Document filed Jan. 30, 2009.
Parallel U.S. Appl. No. 12/682,882; Nonfinal Office Action dated Sep. 27, 2010.
Parallel U.S. Appl. No. 12/682,882; Examiner's Interview Summary dated Oct. 20, 2010; mailed Oct. 26, 2010.
Parallel U.S. Appl. No. 12/738,068; Examiner's Interview Summary dated Oct. 20, 2010.
Parallel U.S. Appl. No. 12/738,068; Nonfinal Office Action dated Oct. 24, 2010.
U.S. Appl. No. 13/192,329, filed Jul. 27, 2011, First Named Inventor Anatoli Ledenev.
http://www.solarsentry.com; Protecting Your Solar Investment, 2005, Solar Sentry Corp.
Bower, et al. "Innovative PV Micro-Inverter Topology Eliminates Electrolytic Capacitors for Longer Lifetime," 1-4244-0016-3-06 IEEE p. 2038.
Solar Sentry Corp., Protecting Solar Investment "Solar Sentry's Competitive Advantage", 4 pages estimated as Oct. 2008.
Dallas Semiconductor; Battery I.D. chip from Dallas Semiconductor monitors and reports battery pack temperature, Bnet World Network, Jul. 10, 1995.
deHaan, S.W.H., et al; Test results of a 130W AC module, a modular solar AC power station, Photovoltaic Energy Conversion, 1994; Conference Record of the 24th IEEE Photovoltaic Specialists Conference Dec. 5-9, 1994; 1994 IEEE First World Conference, vol. 1, pp. 925-928.
European patent application No. 1999111425 filed Nov. 6, 1999; and various office actions.
Gomez, M; "Consulting in the solar power age," IEEE-CNSV: Consultants' Network of Silicon Valley, Nov. 13, 2007.
Guo, G.Z.; "Design of a 400W, 1 Omega, Buck-boost Inverter for PV Applications," 32nd Annual Canadian Solar Energy Conference, Jun. 10, 2007.
Wang, Ucilia; Greentechmedia; "National semi casts solarmagic;" www.greentechmedia.com; Jul. 2, 2008.
Kroposki, H. Thomas and Witt, B & C; "Progress in Photovoltaic Components and Systems," National Renewable Energy Laboratory, May 1, 2000; NREL-CP-520-27460.
Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; p. 2255, Aug. 6, 2002.
Hua, C et al; "Control of DC-DC Converters for Solar energy System with Maximum Power Tracking," Department of Electrical Engineering; National Yumin University of Science & Technology, Taiwan; vol. 2, Nov. 9-14, 1997; pp. 827-832.
Kern, G; "SunSine (TM)300: Manufacture of an AC Photovoltaic Module," Final Report, Phases I & II, Jul. 25, 1995-Jun. 30, 1998; National Renewable Energy Laboratory, Mar. 1999; NREL-SR-520-26085.
Kang, F et al; Photovoltaic Power Interface Circuit Incorporated with a Buck-boost Converter and a Full-bridge Inverter;' doi:10.1016-j. apenergy.2004.10.009.
Kretschmar, K et al; "An AC Converter with a Small DC Link Capacitor for a 15kW Permanent Magnet Synchronous Integral Motor,Power Electronics and Variable Speed Drive," 1998;7th International Conference; Conf. Publ. No. 456; Sep. 21-23, 1998; pp. 622-625.
Lim, Y.H. et al; "Simple Maximum Power Point Tracker for Photovoltaic Arrays," Electronics Letters May 25, 2000; vol. 36, No. 11.
Linear Technology Specification Sheet, LTM4607, estimated as Nov. 14, 2007.
Matsuo, H et al; Novel Solar Cell Power Supply System using the Multiple-input DC-DC Converter; Telecommunications Energy Conference, 1998; INTELEC, 20th International, pp. 797-8022.
solar-electric.com; Northern Arizona Wind & Sun, All About MPPT Solar Charge Controllers; Nov. 5, 2007.
Oldenkamp, H. et al; AC Modules: Past, Present and Future, Workshop Installing the Solar Solution; pp. 22-23; Jan. 1998; Hatfield, UK.
U.S. Appl. No. 11/333,005, filed Jan. 17, 2006, First Named Inventor Gordon E. Presher, Jr.
Rodriguez, C; "Analytic Solution to the Photovoltaic Maximum Power Point Problem;" IEEE Transactions of Power Electronics, vol. 54, No. 9, Sep. 2007.
De Doncker, R. W.; "Power Converter for PV-Systems," Institute for Power Electrical Drives, RWTH Aachen Univ. Feb. 6, 2006.
Roman, E et al; "Intelligent PV Module for Grid-Connected PV Systems;" IEEE Transactions of Power Electronics, vol. 53, No. 4, Aug. 2006.
Russell, M.C. et al; "The Massachusetts Electric Solar Project: A Pilot Project to Commercialize Residential PC Systems," Photovoltaic Specialists Conference 2000; Conference Record of the 28th IEEE; pp. 1583-1586.
SatCon Power Systems, PowerGate Photovoltaic 50kW Power Converter System; Spec Sheet; Jun. 2004.
Schekulin, Dirk et al; "Module-integratable Inverters in the Power-Range of 100-400 Watts," 13th European Photovoltaic Solar Energy Conference, Oct. 23-27, 1995; Nice, France; p. 1893-1896.
Shimizu, et al; "Generation Control Circuit for Photovoltaic Modules," IEEE Transactions on Power Electronics; vol. 16, No. 3, May 2001.
Takahashi, I. et al; "Development of a Long-life Three-phase Flywheel UPS Using an Electrolytic Capacitorless Converter-inverter," 1999 Scripta Technica, Electr. Eng. Jpn, 127(3); 25-32.
Walker, G.R. et al; "Cascaded DC-DC Converter Connection of Photovoltaic Modules," IEEE Transactions of Power Electronics, vol. 19, No. 4, Jul. 2004.
Walker, G.R. et al; "PV String Per-Module Power Point Enabling Converters," School of Information Technology and Electrical Engineering; The University of Queensland, presented at the Australasian Universities Power Engineering Conference, Sep. 28-Oct. 1, 2003 in Christchurch; AUPEC2003.

Cambridge Consultants, Interface Issue 43, Autumn 2007.

United States Provisional Application filed Oct. 15, 2007, U.S. Appl. No. 60/980,157.

United States Provisional Application filed Oct. 23, 2007, U.S. Appl. No. 60/982,053.

United States Provisional Application filed Nov. 15, 2007, U.S. Appl. No. 60/986,979.

United States Provisional Application filed Dec. 6, 2006, U.S. Appl. No. 60/868,851.

United States Provisional Application filed Dec. 6, 2006, U.S. Appl. No. 60/868,893.

United States Provisional Application filed Dec. 7, 2006, U.S. Appl. No. 60/868,962.

United States Provisional Application filed Mar. 26, 2007, U.S. Appl. No. 60/908,095.

United States Provisional Application filed May 9, 2007, U.S. Appl. No. 60/916,815.

U.S. Appl. No. 12/340,540, filed Dec. 19, 2008, First Named Inventor Mordechay Avrutski.

U.S. Appl. No. 12/357,357, filed Jan. 21, 2009, First Named Inventor Earl G. Powell.

U.S. Appl. No. 12/392,042, filed Feb. 24, 2009, First Named Inventor Ron Hadar.

U.S. Appl. No. 12/467,117, filed May 15, 2009, First Named Inventor Leonid Rozenboim.

U.S. Appl. No. 12/542,632, filed Aug. 17, 2009, First Named Inventor Ron Hadar.

U.S. Appl. No. 12/567,169, filed Sep. 25, 2009, First Named Inventor Ron Hadar.

U.S. Appl. No. 12/628,977, filed Dec. 1, 2009, First Named Inventor Ron Hadar.

U.S. Appl. No. 12/628,997, filed Dec. 1, 2009, First Named Inventor Ron Hadar.

U.S. Appl. No. 12/202,110, filed Aug. 29, 2008, First Named Inventor Mordechay Avrutski.

U.S. Appl. No. 12/467,116, filed May 15, 2009, First Named Inventor Leonid Rozenboim.

U.S. Appl. No. 12/506,929, filed Jul. 21, 2009, First Named Inventor Ron Hadar.

U.S. Appl. No. 11/950,224, filed Dec. 4, 2007, First Named Inventor Meir Adest.

U.S. Appl. No. 11/950,271, filed Dec. 4, 2007, First Named Inventor Meir Adest.

U.S. Appl. No. 11/950,307, filed Dec. 4, 2007, First Named Inventor Meir Adest.

U.S. Appl. No. 11/951,419, filed Dec. 4, 2007, First Named Inventor Meir Adest.

U.S. Appl. No. 11/951,485, filed Dec. 6, 2007, First Named Inventor Meir Adest.

U.S. Appl. No. 11/951,562, filed Dec. 6, 2007, First Named Inventor Meir Adest.

U.S. Appl. No. 12/314,113, filed Dec. 4, 2008, First Named Inventor Meir Adest.

U.S. Appl. No. 12/314,115, filed Dec. 4, 2008, First Named Inventor Meir Adest.

U.S. Appl. No. 12/328,742, filed Dec. 4, 2008, First Named Inventor Meir Adest.

U.S. Appl. No. 12/329,520, filed Dec. 5, 2008, First Named Inventor Meir Adest.

U.S. Appl. No. 12/411,294, filed Mar. 25, 2009, First Named Inventor Guy Sella.

U.S. Appl. No. 12/435,549, filed May 5, 2009, First Named Inventor Meir Gazit.

U.S. Appl. No. 12/409,763, filed Mar. 24, 2009, First Named Inventor Tzachi Glovinsky.

U.S. Appl. No. 12/409,604, filed Mar. 24, 2009, First Named Inventor Tzachi Glovinsky.

U.S. Appl. No. 12/329,525, filed Dec. 5, 2008, First Named Inventor Meir Adest.

U.S. Appl. No. 12/314,114, filed Dec. 4, 2008, First Named Inventor Meir Gzait.

U.S. Appl. No. 12/187,335, filed Aug. 6, 2008, First Named Inventor Amir Fishelov.

U.S. Appl. No. 12/338,610, filed Dec. 18, 2008, First Named Inventor James Allen.

U.S. Appl. No. 12/495,840, filed Jul. 1, 2009, First Named Inventor Leo Francis Casey.

U.S. Appl. No. 12/738,068, filed Apr. 14, 2010, First Named Inventor Robert M. Porter.

U.S. Appl. No. 12/682,882, filed Apr. 13, 2010, First Named Inventor Robert M. Porter.

U.S. Appl. No. 12/682,559, filed Apr. 9, 2010, First Named Inventor Douglas S. Schatz.

Linares, L., et al., Improved Energy Capture in Series String Photovoltaics via Smart Distributed Power Electronics; Proceedings APEC 2009: 24th Annual IEEE Applied Power Electronics Conference, Washington, D.C., Feb. 2009.

Knaupp, W. et al., Operation of a 10 kW PV facade with 100 W AC photovoltaic modules, 25th PVSC; May 13-17, 1996; Washington D.C.

Schoen, T.J.N., BIPV overview & getting PV into the marketplace in the Netherlands, The 2nd World Solar Electric Buildings Conference: Sydney Mar. 8-10, 2000.

Stern M., et al., Development of a Low-Cost Integrated 20-kW-AC Solar Tracking Subarray for Gid-Connected PV Power System Applications—Final Report, National Renewable Energy Laboratory, Jun. 1998.

Verhoeve, C.W.G., et al., Recent Test Results of AC-Module inverters, Netherlands Energy Research Foundation ECN, 1997.

Roman, E., et al. Experimental results of controlled PV Module for building integrated PV systems; Science Direct; Solar Energy, vol. 82, Issue 5, May 2008, pp. 471-480.

International Application No. PCT/US08/57105, International Preliminary Report on Patentability, mailed Mar. 12, 2010.

International Application No. PCT/US09/41044, Search Report dated Jun. 5, 2009.

International Application No. PCT/US09/41044, Written Opinion dated Jun. 5, 2009.

International Application No. PCT/US08/79605, Search Report dated 02-03-20009.

International Application No. PCT/US08/79605, Written Opinion dated 02-03-20009.

International Application No. PCT/US08/80794, Search Report dated Feb. 23, 2009.

International Application No. PCT/US08/80794, Written Opinion dated Feb. 23, 2009.

Edelmoser, K. H. et al.; High Efficiency DC-to-AC Power Inverter with Special DC Interface; Professional Paper, ISSN 0005-1144, Automatika 46 (2005) 3-4, 143-148.

Esmaili, Gholamreza; Application of Advanced Power Electronics in Renewable Energy Sources and Hygrid Generating Systems, Ohio State University, Graduate Program in Electrical and Computer Engineering, 2006, Dissertation.

Jung, D; Soft Switching Boost Converter for Photovoltaic Power Generation System, 2008 13th International Power Electronics and Motion Control Conference (EPE-PEMC 2008).

Joo, Hyuk Lee; "Soft Switching Multi-Phase Boost Converter for Photovoltaic System," Power Electronics and Motion Control Conference, Sep. 1, 2008. EPE-PEMC 2008. 13th.

Kuo, J.-L.; "Duty-based Control of Maximum Power Point Regulation for Power Converter in Solar Fan System with Battery Storage," Proceedings of the Third IASTED Asian Conference, Apr. 2, 2007, Phuket, Thialand.

Enslin, J.H.R.; "Integrated Photovoltaic Maximum Power Point Tracking Converter;" Industrial Electronics, IEEE Transactions on vol. 44, Issue 6, Dec. 1997, pp. 769-773.

Dehbonei, Hooman; Corp author(s): Curtin University of Technology, School of Electrical and Computer Engineering; 2003; Description: xxi, 284 leaves; ill.; 31 cm. Dissertation: Thesis. Abstract.

Duncan, Joseph, A Global Maximum Power Point Tracking DC-DC Converter, Massachussetts Institute of Technology, Dept. of Electrical Engineering and Computer Science Dissertation; Jan. 20, 2005.

Enrique, J.M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages). Association for Applied Solar Energy, Alt. Journal; Uniform Title: Solar energy (Photnix, AZ); Key Title: Solar energy; Preceding Title: Journal of solar energy, science and engineering; Standard No. ISSN: 0038-092X CODEN: SRENA4. No abstract available.

Chung, H.S.H.; Hui Tse, K.K.; "A Novel Maximum Power Point Tracking Technique for PV Panels;" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.

Mutoh, Nobuyoshi; A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; p. 97-103. Abstract.

Rajan, Anita; "Maximum Power Point Tracker Optimized for Solar Powered Cars;" Society of Automotive Engineers, Transactions, v 99, n Sect 6, 1990, p. 1408-1420; Abstract.

Mutoh, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, p. 2264-2271. Abstract.

Ho, Billy M.T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p. 1559-1565.

Esram, T., Chapman, P.L., "Comparison of Photovoltaic Array Maximum Power Point Tracking Techniques," Energy Conversion, IEEE Transactions, Vo. 22, No. 2, pp. 439-449, Jun. 2007.

Nishida, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China; p. 1785-1790. Abstract.

Anon Source; International Symposium on Signals, Circuits and Systems, Jul. 12-13, 2007; Iasi, Romania; Publisher: Institute of Electrical and Electroncis Engineers Computer Society; Abstract.

Case, M.J.; "Minimum Component Photovoltaic Array Maximum Power Point Tracker," Vector (Electrical Engineering), Jun. 1999; p. 4-8; Abstract.

Daher, Sergio; "Analysis, Design and Implementation of a High Efficiency Multilevel Converter for Renewable Energy Systems," Kassel University Press, ISBN: 978-3-89958-236-9, 2006, 147 pages. Abstract.

Xue, John, "PV Module Series String Balancing Converters," Supervised by Geoffrey Walker, Nov. 6, 2002; University of Queensland, School of Information Technology and Electrical Engineering.

Siri, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, pp. 228-234.

Reimann, T, Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2 pp. 978-984. Abstract.

Kaiwei, Yao, Mao, Ye; Ming, Xu; Lee, F.C.; "Tapped-inductor Buck Converter for High-step-down DC-DC Conversion," IEEE Transactions on Power Electronics, vol. 20, Issue 4, Jul. 2005; pp. 775-780; Abstract.

Ertl, H; Kolar, J.W.; Zach, F.C.; "A Novel Multicell DC-AC Converter for Applications in Renewable Energy Systems;" IEEE Transactions on Industrial Electronics, Oct. 2002; vol. 49, Issue 5, pp. 1048-1057; Abstract.

Bascope, G.V.T.; Barbi, I; "Generation of a Family of Non-isolated DC-DC PWM Converters Using New Three-state Switching Cells;" 2000 IEEE 31st Annual Power Electronics Specialists Conference in Galway, Ireland; vol. 2, pp. 858-863; Abstract.

Duan, Rouo-Yong; Chang, Chao-Tsung; "A Novel High-efficiency Inverter for Stand-alone and Grid-connected Systems," 2008 3rd IEEE Conference on Industrial Electronics and Applications in Singapore, Jun. 3-5, 2008; Article No. 4582577. Abstract.

Cuadras, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; pp. 78-82 and 12-15. Abstract.

Quan, Li; Wolfs, P; "An Analysis of the ZVS Two-inductor Boost Converter Under Variable Frequency Operation," IEEE Transactions on Power Electronics, Central Queensland University, Rockhamton, Qld, AU; vol. 22, No. 1, Jan. 2007; pp. 120-131. Abstract.

Yuvarajan, S; Dachuan, Yu; Shanguang, Xu; "A Novel Power Converter for Photovoltaic Applications," Journal of Power Sources, Sep. 3, 2004; vol. 135, No. 1-2, pp. 327-331; Abstract.

Power Article, Aerospace Systems Lab, Washington University, St. Louis, MO; estimated at Sep. 2007.

International Application No. PCT/US08/60345, International Search Report dated Aug. 18, 2008.

International Application No. PCT/US08/60345, Written Opinion dated Aug. 18, 2008.

International Application No. PCT/US08/57105, International Search Report dated Jun. 25, 2008.

International Application No. PCT/US08/57105, Written Opinion dated Jun. 25, 2008.

International Application No. PCT/US08/70506, International Search Report dated Sep. 26, 2008.

International Application No. PCT/US08/70506, Written Opinion dated Sep. 26, 2008.

Chen, J., et al. Buck-Boost PWM Converters Having Two Independently Controlled Switches, IEEE Power Electronics Specialists Conference, Jun. 2001, vol. 2, pp. 736-741.

Walker, G. et al. PhotoVoltaic DC-DC Module Integrated Converter for Novel Cascaded and Bypass Grid Connection Topologies—Design and Optimisation, 37th IEEE Power Electronics Specialists Conference / Jun. 18-22, 2006, Jeju, Korea.

Chen, J., et al. A New Low-Stress Buck-Boost Converter for Universal-Input PFC Applications, IEEE Applied Power Electronics Conference, Feb. 2001.

International Application No. PCT/US08/70506 corrected International Preliminary Report on Patentability, mailed Jun. 25, 2010.

Tse, K.K.et al. "A Novel Maximum Power Point Tracking Technique for PV Panels;" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.

Feuermann, D. et al., Reversible low solar heat gain windows for energy savings. Solar Energy vol. 62, No. 3, pp. 169-175, 1998.

International Patent Application No. PCT/US08/60345. International Prelimianry Report on Patentability dated Aug. 30, 2010.

TwentyNinety.com/en/about-us/, printed Aug. 17, 2010; 3 pages.

National Semiconductor News Release—National semiconductor's SolarMagic Chipset Makes Solar Panels "Smarter" May 2009.

SM3320 Power Optimizer Specifications; SolarMagic Power Optimizer Apr. 2009.

Parallel U.S. Appl. No. 12/738,068; Nonfinal Office Action dated Nov. 24, 2010.

Parallel U.S. Appl. No. 12/682,559; Nonfinal Office Action dated Dec. 10, 2010.

European Patent Application No. 07 873 361.5 Office Communication dated Jul. 12, 2010 and applicant's response dated Nov. 22, 2010.

International Patent Application No. PCT/US2008/079605. International Preliminary Report on Patentability dated Jan. 21, 2011.

Parallel U.S. Appl. No. 12/738,068; Examiner's Interview Summary dated Feb. 3, 2011.

Parallel U.S. Appl. No. 12/682,882; Examiner's Interview Summary dated Feb. 3, 2011.

Parallel U.S. Appl. No. 12/682,559; Examiner's Interview Summary dated Feb. 4, 2011.

International Patent Application No. PCT/US2010/053253. International Search Report and International Written Opinion of the International Searching Authority.
Parallel U.S. Appl. No. 12/682,559; Final Office Action dated Mar. 3, 2011.
Parallel U.S. Appl. No. 12/738,068; Notice of Allowance dated Feb. 24, 2011.
Parallel U.S. Appl. No. 12/682,882; Final Office Action dated May 13, 2011.
Parallel International Application No. PCT/US09/41044; International Preliminary Report on Patentabiity dated Jul. 6, 2011.
Parallel U.S. Appl. No. 12/955,704; Nonfinal Office Action dated Mar. 8, 2011.
Parallel U.S. Appl. No. 12/995,704; Notice of allowance dated Jul. 19, 2011.
Parallel U.S. Appl. No. 12/682,882; Notice of allowance dated Sep. 9, 2011.
Parallel U.S. Appl. No. 12/682,559; Nonfinal office action dated Sep. 23, 2011.
Parallel U.S. Appl. No. 13/059,955; Nonfinal office action dated Jan. 23, 2012.
International Application No. PCT/US10/53253; International Preliminary Report on Patentabiity dated Jan. 25, 2012.
Parallel U.S. Appl. No. 12/682,559; Notice of allowance dated Apr. 17, 2012.
International Application No. PCT/US08/80794; International Preliminary Report on Patentabiity dated May 8, 2012.
Parallel U.S. Appl. No. 13/749,492; Nonfinal office action dated May 16, 2012.
Parallel U.S. Appl. No. 13/192,329; Final office action dated Jun. 13, 2012.
Parallel CN Patent Application No. 200880121101.7; office action dated Sep. 26, 2011.
Parallel CN Patent Application No. 200880121101.7; office action dated Jun. 11, 2012.
Parallel U.S. Appl. No. 13/192,329; Notice of Allowance dated Jul. 30, 2012.
International Application No. PCT/2012/022266, International Search Report dated Jul. 24, 2012.
International Application No. PCT/2012/022266, Written Opinion of the International Searching Authority dated Jul. 24, 2012.
Parallel Chinese Patent Application No. 200880121009.0, Office Action dated Aug. 31, 2012.
Parallel U.S. Appl. No. 13/059,955; Final office action dated Sep. 27, 2012.
Parallel SG Patent Application No. 201107477-0; written opinion dated Nov. 27, 2012.

* cited by examiner

SYSTEMS FOR OPTIMIZED SOLAR POWER INVERSION

This application is a continuation of U.S. application Ser. No. 13/192,329, filed Jul. 27, 2011, which is a continuation of U.S. application Ser. No. 12/955,704, filed Nov. 29, 2010 now U.S. Pat. No. 8,004,116, issued Aug. 23, 2011, which is a continuation of United States application Ser. No. 12/682,889, filed Apr. 13, 2010, now U.S. Pat. No. 7,843,085, issued Nov. 30, 2010, which is the United States National Stage of International Application No. PCT/US2008/057105, filed Mar. 14, 2008, which claims benefit of and priority to U.S. Provisional Application No. 60/980,157, filed Oct. 15, 2007, U.S. Provisional Application No. 60/982,053, filed Oct. 23, 2007, and U.S. Provisional Application No. 60/986,979, filed Nov. 9, 2007, each said patent application and any priority case hereby incorporated herein by reference.

TECHNICAL FIELD

This invention relates to the technical field of solar power, specifically, methods and apparatus for converting electrical power from some type of solar energy source to make it available for use in a variety of applications. The invention focuses on systems that use DC-DC conversion to harvest maximum power from a solar cell, a solar panel, or strings of panels so that this power can be provided for DC or AC use, perhaps for transfer to a power grid or the like. Unusually efficient circuitry and control methods are provided so that minimal power is lost in the process of achieving the DC-DC conversion to achieve efficiencies in conversion that are extraordinarily high compared to traditional systems.

BACKGROUND

Solar power is one of the more desirable types of renewal energy. For years it has been touted as one of the most promising for our increasingly industrialized society. Even though the amount of solar power theoretically available far exceeds most, if not all, other energy sources (renewable or not), there remain practical challenges to utilizing this energy. In general, solar power remains subject to a number of limitations that have kept it from fulfilling the promise it holds. In one regard, it has been a challenge to implement in a manner that provides adequate electrical output as compared to its cost. The present invention addresses an important aspect of this in a manner that significantly increases the ability to cost-effectively permit solar power to be electrically harnessed so that it may be a cost-effective source of electrical power.

One of the most efficient ways to convert solar power into electrical energy is through the use of solar cells. These devices create a photovoltaic DC current through the photovoltaic effect. Often these solar cells are linked together electrically to make a combination of cells into a solar panel or a PV (photovoltaic) panel. Voltage, current, and power levels may be provided at an individual domestic level, such as for an individual house or the like. Similarly, large arrays of many, many panels may be combined in a sea of panels to create significant, perhaps megawatt outputs to public benefit perhaps as an alternative to creating a new coal burning power plant, a new nuclear power plant, or the like. PV panels are often connected in series to provide high voltage at a reasonable current. This may be accomplished to make electrical interconnect losses low. The output of a solar cell or a solar panel, or even combinations thereof, is frequently then converted to make the electrical power most usable since the power converters often employed can use high voltage input more effectively. Electrical requirements of producing power from a solar panel can make it difficult to achieve this conversion in as efficient a manner as desired. Conventional power converters sometimes have their input handled by an MPPT (maximum power point tracking) circuit to extract the maximum amount of power from one or more or even a string of series connected panels. This constraint can make the conversion process less efficient. And because of the nature of solar panels and insulation, such conversion usually needs to have the ability to both increase and decrease a parameter (impedance, voltage, or the like).

Another problem that arises with this approach is that often the PV panels act as current sources and when combined in a series string, the lowest power panel can limit the current through every other panel. Furthermore, solar cells historically have been made from semiconductors such as silicon pn junctions. These junctions or diodes convert sunlight into electrical power. These diodes can have a characteristically low voltage output, often on the order of 0.6 volts. Such cells may behave like current sources in parallel with a forward diode. The output current from such a cell may be a function of many construction factors and, is often directly proportional to the amount of sunlight.

Focusing first on the MPPT aspect, it can be understood that the low voltage of such a solar cell can be difficult to convert to power suitable for supplying power to an electric power grid. Often, many diodes are connected in series on a photovoltaic panel. For example, a possible configuration could have 36 diodes or panels connected in series to make 21.6 volts. With the shunt diode and interconnect losses in practice such panels might only generate 15 volts at their maximum power point (MPP). For some larger systems having many such panels, even 15 volts may be too low to deliver over a wire without substantial losses. In addition, typical systems today may combine many panels in series to provide voltages in the 100's of volts in order to minimize the conduction loss between the PV panels and a power converter.

Electrically, however, there can be challenges to finding the right input impedance for a converter to extract the maximum power from such a string of PV panels. The aspect of extracting power at a maximum power point is often referred to as MPP tracking. Some such systems exist, however, there remain limitations, some of which are discussed here. This constraint can even make the conversion process less efficient. First, the PV panels may act as current sources. As such, the panel producing the lowest current may limit the current through the whole string. In an undesirable case, if one weak panel is producing moderately less, it might become back biased by the remainder of the panels. Reverse diodes can be placed across each panel to limit the power loss in this case and to protect the panel from reverse breakdown.

In systems, at least the following problems can arise and cause some degree of loss in solar energy harvesting:
  A. Non-uniformity between panels.
  B. Partial shade
  C. Dirt or accumulated matter blocking sunlight
  D. Damage to a panel
  E. Non-uniform degradation of panels over time It may also be troublesome when expensive PV panels are placed in series and the weakest panel limits the power from every other panel. Unfortunately, the series connection may be desired to get high enough voltage to efficiently transmit power through a local distribution to a load, perhaps such as a grid-tied inverter. Further, in many systems, the PV panels may be located on a rooftop, such as for a residential installation. And the inverter is often located at a distance from the rooftop, such as by the power meter or the like. So in embodiments, a way to connect the panels in series but not suffer the losses caused by the lowest power panel, or any series parallel combination, may be needed. There may also be a desire to use unlike types of panels at the same time perhaps without regarding to the connection configuration desired (series or parallel, etc.) as well as other brands of components such as traditional inverters and the like that achieve traditional inverting.

Whether for maximum power point tracking or conversion efficiency, the techniques of photovoltaic power conversion have been recognized as an important limit to solar energy ultimately realizing its potential. Methods of solar power conversion have been proposed that utilize DC/DC converters on each panel along with an MPP circuit as one attempt to enhance the efficiency of energy harvesting when utilizing strings of solar panels. Such attempts, however, have resulted in unacceptably low efficiencies that have made such approaches impractical. These techniques have even been dismissed to some degree by those considering such issues. For example, in the article by G. R. Walker, J. Xue and P. Sernia entitled "PV String Per-Module Maximum Power Point Enabling Converters" those authors may have even suggested that efficiency losses were inevitable but that this module approach held advantages, even though it was attended by poor efficiency. There seems to have been an acceptance that MPPT aspects inevitably led to low efficiency conversion. Similarly, two of the same authors, G. R. Walker and P. Sernia in the article entitled "Cascaded DC-DC Converter Connection of Photovoltaic Modules" suggested that the needed technologies are always at an efficiency disadvantage. These references even include an efficiency vs. power graph showing a full power efficiency of approximately 91%. Operation of expensive PV panels with operation through a low efficiency converter is simply not acceptable in the marketplace. The present invention shows that such inefficiencies are not inevitable and highly efficient operation can in fact be achieved in such operations.

Another less understood problem with large series strings of PV panels may be with highly varying output voltage, the inverter stage driving the grid my need to operate over a very wide range also lowering its efficiency. Again, this constraint can also limit conversion efficiency. It may also be a problem if during periods of time when the inverter section is not powering the grid that the input voltage to this stage may increase above regulatory limits. Or conversely, if the voltage during this time is not over a regulatory limit then the final operational voltage may be much lower than the ideal point of efficiency for the inverter.

In addition, there may be start-up and protection issues which add significant cost to the overall power conversion process. Other less obvious issues affecting Balance of System (BOS) costs for a solar power installation are also involved. Thus, what at least one aspect of electrical solar power needs is an improvement in efficiency in the conversion stage of the electrical system. The present invention provides this needed improvement.

DISCLOSURE OF THE INVENTION

As mentioned with respect to the field of invention, the invention includes circuitry aspects which may be combined in different ways. The following descriptions are provided to list elements and describe some of the embodiments of the present invention. These elements are listed with initial embodiments, however it should be understood that they may be combined in any manner and in any number to create additional embodiments. The variously described circuitry and system examples and preferred embodiments should not be construed to limit the present invention to only the explicitly described circuit, systems, techniques, and applications. Further, this description should be understood to support and encompass descriptions and claims of all the various embodiments, circuits, systems, techniques, methods, devices, and applications with any number of the disclosed elements, with each element alone, and also with any and all various permutations and combinations of all elements in this or any subsequent application.

In various embodiments, the present invention discloses systems, circuits, and different initial exemplary architectures through which one may achieve some of the goals of the present invention. Systems provide alternating modes of photovoltaic conversion, high efficiency conversion designs, and even multimodal conversion techniques. Some architectures may combine a PV panel with MPP and even a dual mode, highly efficient power conversion circuitry to make what may be referred to as a Power Conditioner (PC) element. As discussed below, such Power Conditioners may be combined in series or parallel or any combination of series/parallel and can be designed so that the solar panels will largely or even always produce their full output while also providing high efficiency DC-DC conversion. Even differing types of panels having different output characteristics may be combined to produce maximum power from each panel. In some designs, a series string may be used to get a high voltage useful for power transmission, and each Power Conditioner can be designed to make its maximum power while simultaneously providing highly efficient DC-DC conversion. Each of the DC photovoltaic outputs can at times present a relatively high voltage and high power; further, because of the nature of solar insulation, these voltages and powers usually are highly varying—at times there is no insulation (at night) and at times it is very intense (e.g., mid day on a sunny day).

As to the MPPT aspect, in embodiments, this invention may permit each and every panel to individually produce its maximum power thereby harvesting more total energy from the overall system. Systems may be configured with an MPP circuit and a highly efficient power conversion circuit on each panel. These circuits may be made as simple inexpensive circuitry to perhaps perform several functions. First, MPPT can be achieved and this circuit may be designed to extract the maximum power available from each and every panel. Second, it may be configured to transform to an impedance or voltage which naturally combines with the other panels in a series string. This circuit may also be configured for parallel connected panels or even for single cells or strings within a panel. Embodiments may be configured so that the output may be a higher voltage output (for example, 400V). Additionally, configurations may allow for an easy to administer overvoltage or other protection, perhaps even with or without feedback elements that control the system to avoid an overvoltage or other condition.

The addition of individual MPP circuitry to act upon a panel may even be configured so as to provide an inexpensive addition and, in some embodiments, may replace the need for the same function in the power converter. The circuitry may be added to the PV panels and may not need to be repeated in a grid-tied inverter. This may thus result in the same total circuitry with significant advantage. In embodiments there may actually be several small MPP converters replacing one large one. Importantly from some perspectives, this can be achieved through conversion circuitry and control that can provide highly efficient DC-DC conversion even with 97%, 98%, 99.2%, or essentially even wire transmission loss efficiencies which can be considered the highest possible while also achieving MPPT operation for the panels. This may result in even greater energy harvesting and better cost result.

MODE(S) FOR CARRYING OUT THE INVENTION

As mentioned above, the invention discloses a variety of aspects that may be considered independently or in combination with others. Initial understanding begins with the fact that one embodiment of a power conditioner according to the present invention may provide an alternative process converter, a dual mode photovoltaic converter, a very high efficiency photovoltaic converter, or a multimodal photovoltaic converter, all perhaps with the inclusion of maximum power point tracking (MPP or MPPT) aspects. Such elements may present alternative process conversion, dual mode photovoltaic conversion, a highly efficient method of solar energy power conversion, etc. Embodiments may include operational boundaries such as for output voltage, output current, and perhaps even, output power. Each of these should be understood from a general sense as well as through embodiments that display initial applications for implementation. Some initial benefits of each of these aspects are discussed individually and in combination in the following discussion as well as how each represents a class of topologies, rather than just those initially disclosed.

Figure 1:
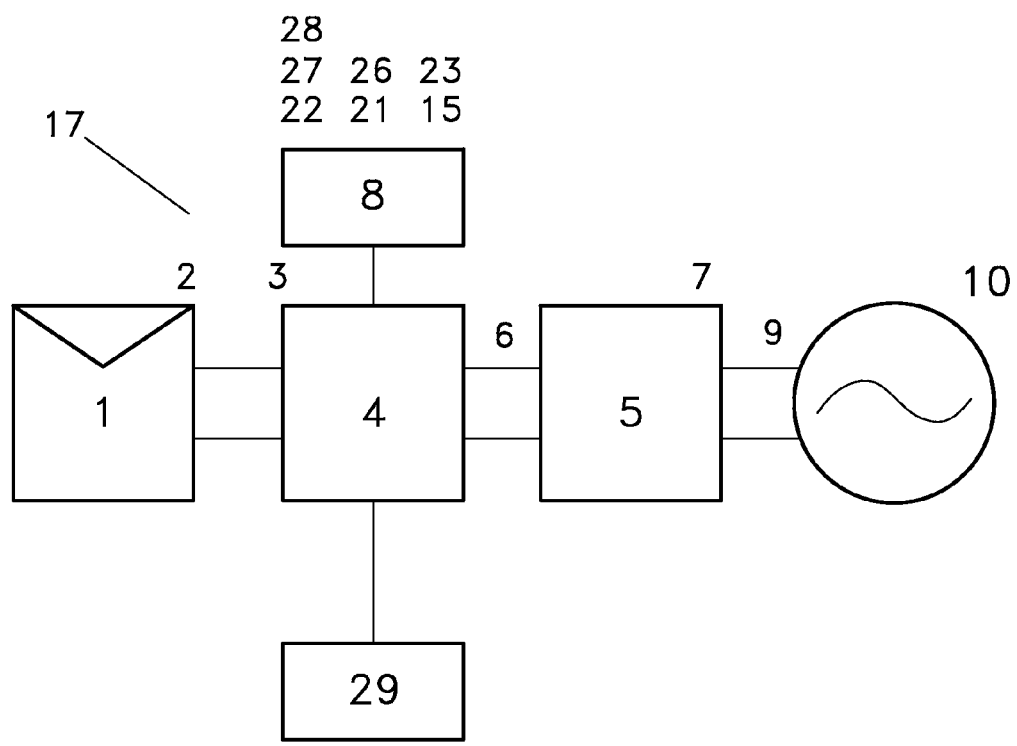
FIG. 1 shows a schematic of a conversion system according to one embodiment of the invention for a single representative solar source.

FIG. 1 shows one embodiment of a solar energy power system illustrating the basic solar conversion principles of the present invention. As shown, it involves a solar energy source (1) feeding into a high efficiency photovoltaic DC-DC power converter (4) providing a converted output such as a photovoltaic DC power output to a photovoltaic DC-AC inverter (5) that may provide a photovoltaic AC power output perhaps to ultimately interface with a grid (10). As may be appreciated, the solar energy source (1) may be a solar cell, a solar panel, or perhaps even a string of panels. Regardless, the solar energy source (1) may provide (and accomplish the step of creating) a DC photovoltaic output (2). This high voltage, highly varying DC photovoltaic output (2) may serve as (and accomplish the step of establishing the output as) a DC input (3) to a high efficiency photovoltaic DC-DC power converter (4).

The high efficiency photovoltaic DC-DC power converter (4) may have its operation controlled by a highly efficient capability generally indicated as converter functionality control circuitry (8) which may be achieved by high efficiency photovoltaic converter control circuitry. As one of ordinary skill in the art should well appreciate, this converter functionality control circuitry (8) may be embodied as true circuitry hardware or it may be firmware or even software to accomplish the desired control and would still fall within the meaning of a converter functionality control circuitry (8). Similarly, the high efficiency photovoltaic DC-DC power converter (4) should be considered to represent photovoltaic DC-DC power conversion circuitry. In this regard it is likely that hardware circuitry is necessary, however combinations of hardware, firmware, and software should still be understood as encompassed by the circuitry term.

As illustrated in FIG. 1, the various elements may be connected to each other. Direct connection is but one manner in which the various elements may be responsive to each other, that is, some effect in one may directly or indirectly cause an effect or change in another. By referring to an item connected to another item, it should be understood that the connection may be direct or indirect, that intermediate elements or components may be included, and even that one element may be achieved by a collection of components if desired. The high efficiency photovoltaic DC-DC power converter (4) may act to convert its input and thus provide (and accomplish the step of establishing) a converted DC photovoltaic output (6) such as a photovoltaic DC power output which may serve as an input to a photovoltaic DC-AC inverter (5) which may be of a variety of designs and brands. This DC-AC inverter (5) may be a traditional inverter for grid output for any system and may or may not be included in embodiments of the solar energy power system and the high efficiency photovoltaic DC-DC power converter (4) may be provided alone or in combination with an entire system. If included, the overall system may present a high efficiency solar energy power conversion system and if with an inverter capability, the system may serve to accomplish the step of perhaps traditionally inverting the DC power or the DC photovoltaic input into a high power inverted AC (7) such as an inverted AC photovoltaic power output (7) that can be used by, for example, at power levels such as for a power grid (10) through some connection termed an AC power grid interface (9). In this manner the system may create a DC photovoltaic output (6) which may be established as an input to some type or brand of DC-AC inverter such as a traditional photovoltaic DC-AC inverter (5) (e.g., an inverter that has no unusual system requirements such as shunt regulation or the like). This step of inverting an input should be understood as encompassing creation of any substantially alternating signal from any substantially unidirectional current flow signal even if that signal is not itself perfectly, or even substantially, steady.

Figure 2:
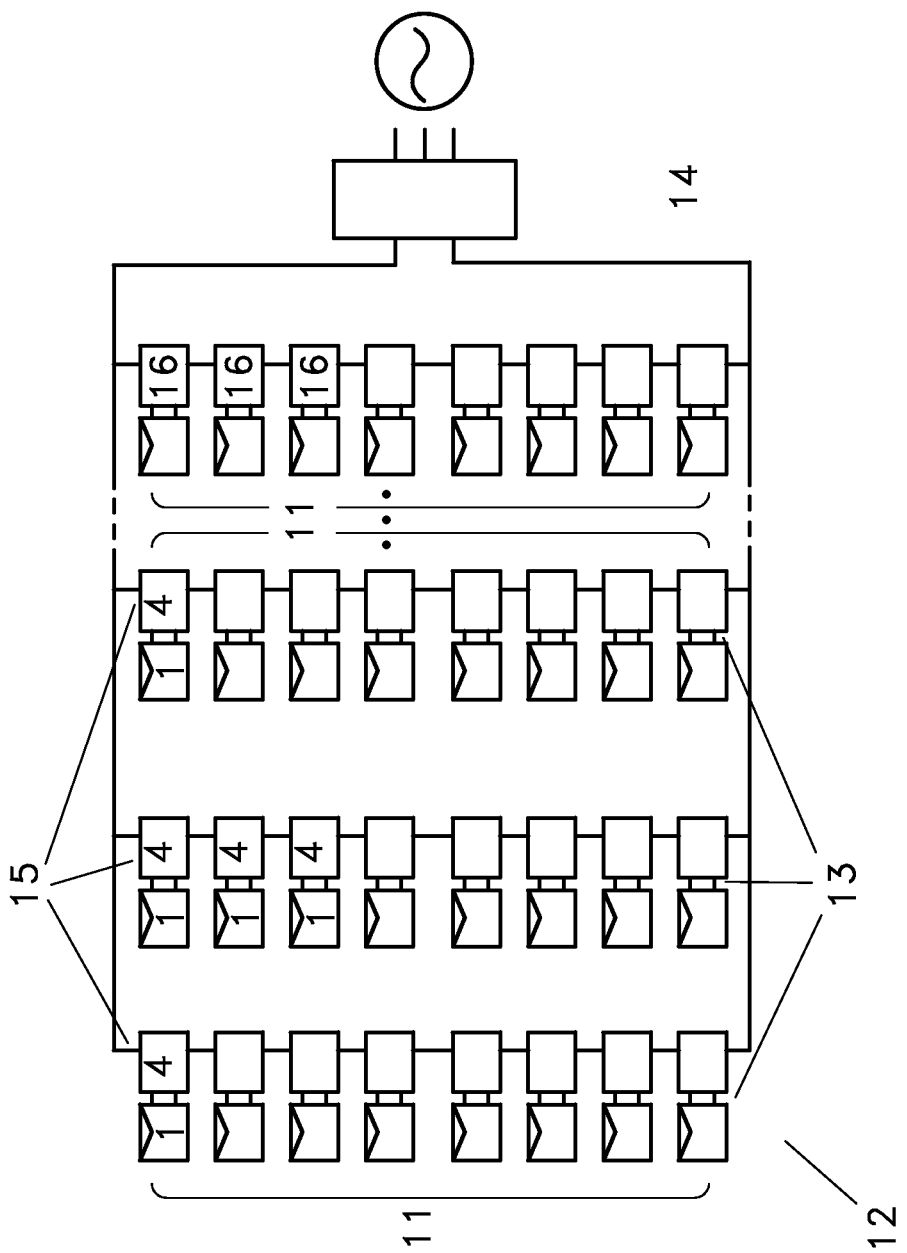
FIG. 2 shows a schematic of a sea of interconnected strings of panels according to one embodiment of the invention.
Figure 6:
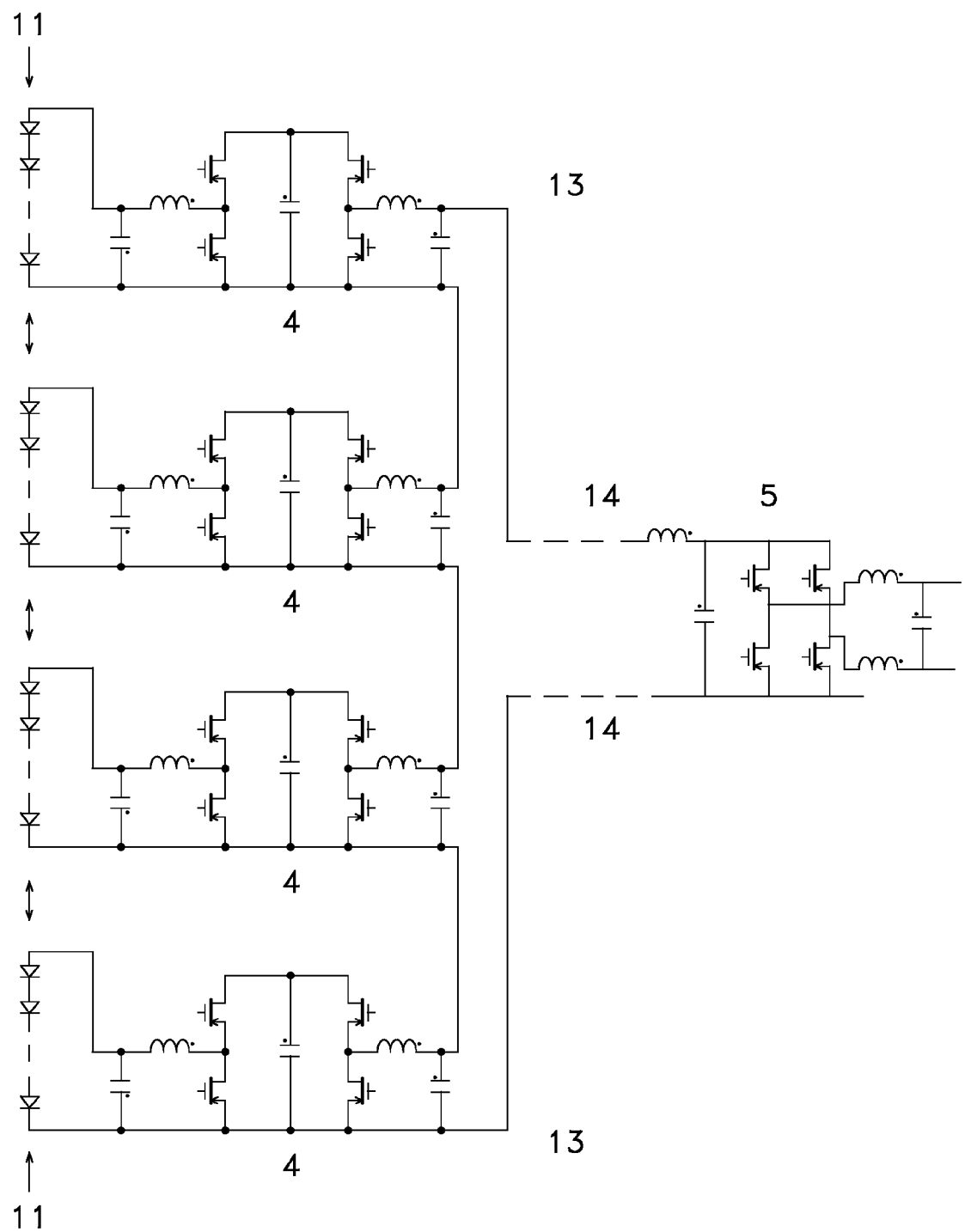
FIG. 6 shows an embodiment of the invention with series connected panels and a single grid-tied inverter configuration.

As show in FIGS. 2 and 6, individual solar energy sources (1)—whether at a cell, panel, or module level—may be established as a plurality of such sources, each having their own DC photovoltaic output. These may be combined to create a series of electrically connected sources, perhaps to present a series string for solar power energy power conversion. Such combinations may be responsive through either series or parallel connections. As shown in a series arrangement in FIGS. 2 and 6, the connected plurality may form a string of electrically connected items perhaps such as a string of electrically connected solar panels (11). As may be easily appreciated, this string of electrically connected solar panels (11) may accomplish the step of creating a DC photovoltaic output from a plurality of solar panels. As shown in FIG. 2, each of these strings may be a component to a much larger combination perhaps forming a photovoltaic array (12) or even a sea of combined solar energy sources. By either physical or electrical layout, certain of these cells, panels, or strings may be adjacent in that they may be exposed to somewhat similar electrical, mechanical, environmental, solar, or insulative exposure conditions. In situations where large arrays are provided, it may be desirable to include a high voltage DC-AC solar power inverter perhaps with a three phase high voltage inverted AC photovoltaic output as schematically illustrated in FIG. 2.

As illustrated for an electrically serial combination, output may be combined so that their voltages may add whereas their currents may be identical. Conversely, electrically parallel combinations may exist. FIGS. 2 and 6 illustrate embodiments that are connected to accomplish serially combining or serially connecting items such as the converted DC photovoltaic outputs (6) of each to create a higher voltage converted DC photovoltaic input to a DC-AC inverter (5). As discussed below, embodiments can include a plurality of series connected high efficiency switchmode photovoltaic DC-DC converters, these converters may be substantially power isomorphic switchmode photovoltaic voltage (or impedance) converters and perhaps the step of individually substantially power isomorphically converting each said high voltage, highly varying DC photovoltaic outputs, or utilizing a plurality of series connected substantially power isomorphic switchmode photovoltaic voltage converters, each independently responsive to one of said plurality of solar panels. Such may be accomplished while maintaining maximum power point operation. As shown, these serial connections may be of the converted DC photovoltaic outputs (6) which may then create a converted DC photovoltaic output (13) which may serve as a converted DC photovoltaic input (14) to some type or brand of photovoltaic DC-AC inverter (5) or other load. Again, each solar power source (1) may be at the cell, panel, string, or even array level. As would be well understood, parallel connections and the step of parallel connecting converters or their outputs could be accomplished as well.

As mentioned above relative to the MPPT aspect, circuitry and systems can be configured to extract as much power as possible from the solar power sources (1). Electrically, this is accomplished by achieving operation to operate at one or more solar cell, panel, or string's maximum power point (MPP) by MPP circuitry or maximum power point tracking (MPPT). Thus, in embodiments, a solar power system according to the invention may include: an MPPT control circuit with a power conversion circuit. Significant to embodiments of the invention is the fact that by unique photovoltaic DC-DC converter circuitry, high efficiency conversion can be achieved with while accomplishing MPPT. Embodiments may even include range limiting circuitry as discussed later.

Figure 3:
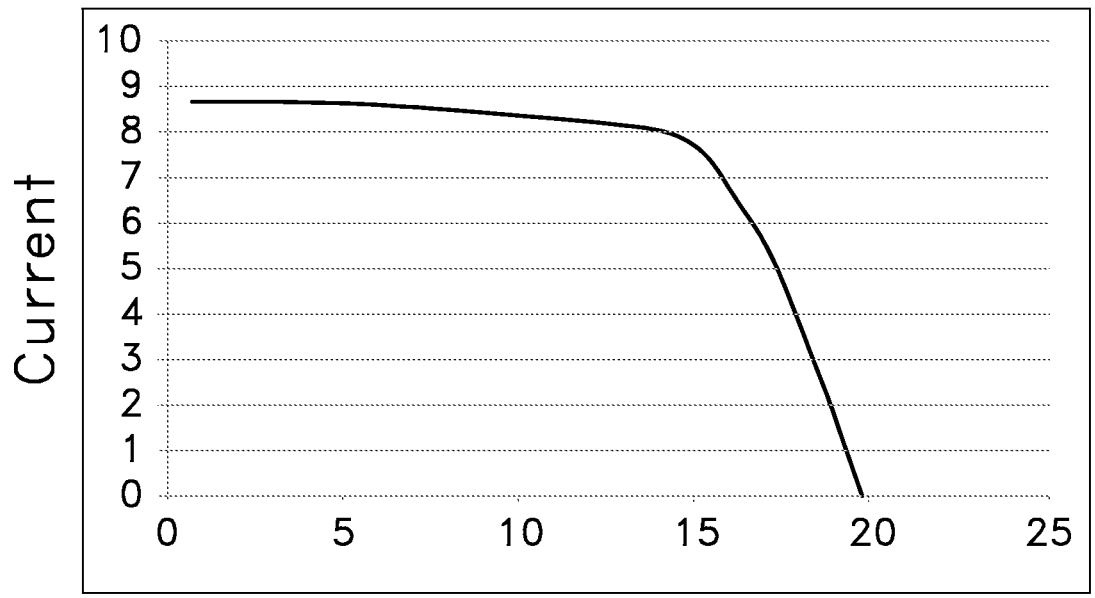
FIG. 3 shows a plot of a current and voltage relationship for a representative solar panel.
Figure 4:
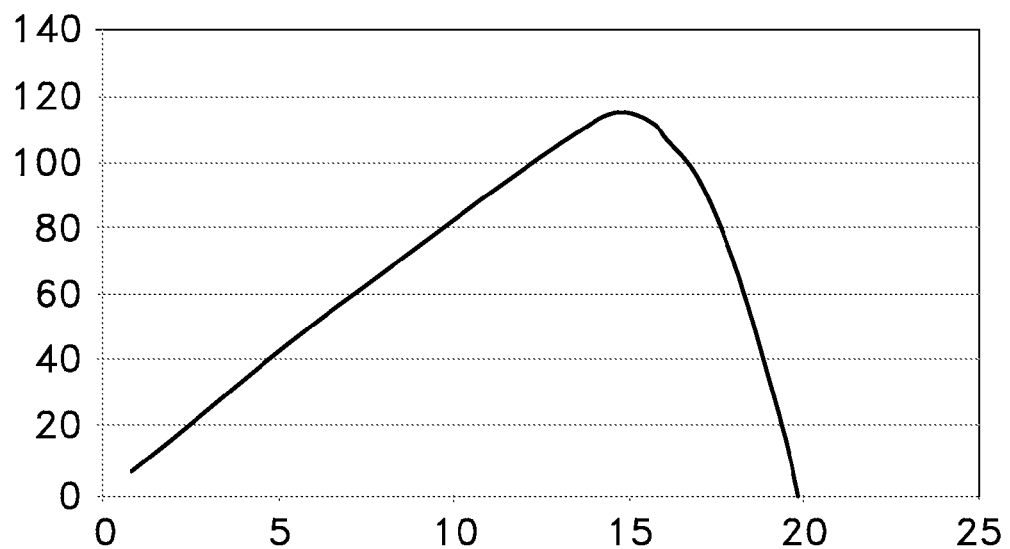
FIG. 4 shows a plot of a power and voltage relationship for a similar panel.

The aspect of maximum power point is illustrated by reference to FIGS. 3 and 4 and the Maximum Power Point Tracking (MPPT) circuit may be configured to find the optimum point for extracting power from a given panel or other solar energy source (1). This may be accomplished by maximum photovoltaic power point controlling the switch elements. As background, it should be understood that a panel such as may be measured in a laboratory may exhibit the voltage and current relationships indicated in FIG. 3. Current in Amps is on the vertical axis. Voltage in volts is on the horizontal axis. One can multiply the voltage times the current to derive power. This is shown in FIG. 4 with power now on the vertical axis. The goal of an embodiment with an MPPT circuit as used here may be to apply an appropriate load resistance or more precisely impedance to a panel such that the panel may operate to provide its peak power. Of course, as the figures illustrate, this results in converting the voltage derived from the panel. One can see graphically that the maximum power point on this panel under the measurement conditions occurs when the panel produces approximately 15 volts and 8 amperes. This may be determined by a maximum photovoltaic power point converter functionality control circuitry (15) which may even be part or all of the modality of operation of the converter functionality control circuitry (8). As shown in FIG. 2, this can be achieved by a plurality of high efficiency photovoltaic converter control circuitries controlling each of the plurality of high efficiency photovoltaic DC-DC power converters (4). These may include a plurality of individually panel dedicated maximum photovoltaic power point converter functionality control circuitries. In this fashion, the converter or the step of converting may provide a maximum photovoltaic power point modality of photovoltaic DC-DC power conversion or the step of maximum photovoltaic power point converting and this may be accomplished as a step of individual dedicated maximum photovoltaic power point converting a DC photovoltaic input from each of said plurality of solar panels. As mentioned below, this may be accomplished by switching and perhaps also by duty cycle switching, and as such the system may accomplish maximum photovoltaic power point duty cycle switching or the step of maximum photovoltaic voltage determinatively duty cycle switching, and may include maximum photovoltaic power point converter control duty cycle switching circuitry.

As one skilled in the art would appreciate, there are numerous circuit configurations that may be employed to derive MPP information. Some may be based on observing short circuit current or open circuit voltage. Another class of solutions may be referred to as a perturb and observe (P&O) circuit. The P&O methods may be used in conjunction with a technique referred to as a "hill climb" to derive the MPP. As explained below, this MPP can be determined individually for each source, for adjacent sources, or for entire strings to achieve best operation. A combined system embodiment may utilize individual panel (understood to include any source level) dedicated maximum photovoltaic power point converter functionality control circuitries (16).

Regardless of whether individually configured or not, in one P&O method, an analog circuit could be configured to take advantage of existing ripple voltage on the panel. Using simple analog circuitry it may be possible to derive panel voltage and its first derivative (V'), as well as panel power and its first derivative (P'). Using the two derivatives and simple logic it may be possible to adjust the load on the panel as follows:

TABLE 1

| V' Positive | P' Positive | Raise MPP |
|---|---|---|
| V' Positive | P' Negative | Lower MPP |
| V' Negative | P' Positive | Lower MPP |
| V' Negative | P' Negative | Raise MPP |

There may be numerous other circuit configurations for finding derivatives and logic for the output, of course. In general, a power conditioner (17) may include power calculation circuitry (firmware, or software) (21) which may even be photovoltaic multiplicative resultant circuitry (22). These circuitries may act to effect a result or respond to an item which is analogous to a power indication (even if not the precise mathematical resultant of a V*I multiplication function). This may of course be a V*I type of calculation of some power parameters and the system may react to either raise or lower itself in some way to ultimately move closer to and eventually achieve operation at an MPP level. By provided a capability and achieving the step of calculating a photovoltaic multiplicative power parameter, the system can respond to that parameter for the desired result.

In embodiments where there is a series string of power conditioners (17) or the like, the current through each PC output may be the same but the output voltage of each PC may be proportional to the amount of power its panel makes. Consider the following examples to further disclose the functioning of such embodiments. Examine the circuit of FIG. 6 and compare it to panels simply connected in series (keep in mind that the simple series connection may have a reverse diode across it). First, assume there are four panels in series each producing 100 volts and 1 amp feeding an inverter with its input set to 400 volts. This gives 400 watts output using either approach. Now consider the result of one panel making 100 volts and 0.8 amps (simulating partial shading—less light simply means less current). For the series connection, the 0.8 amps flows through each panel making the total power 400× 0.8=320 watts. Now consider the circuit of FIG. 6. First, the total power would be 380 watts as each panel is making its own MPP. And, of course, the current from each Power Conditioner must be the same as they are after all still connected in series. But with known power from each PC, the voltage may be calculated as:

$$3V+0.8V=400 \text{ volts, where V is the voltage on each full power panel.}$$

Thus, it can be seen that in this embodiment, three of the panels may have 105.3 volts and one may have 84.2 volts (thus presenting a variation of about 21.1 volts and a variation of about 1.25:1).

Further, in FIG. 6 it can be understood that in some embodiments, an additional benefit may be derived from the inclusion of individual power control. In such embodiments, a power block may be considered as a group of PV panels with power conversion and MPP per panel configurations. As such they may adapt their output as needed to always maintain maximum power from each and every power block. If adapted to be used with such a string of power blocks, the system may even operate with a varying voltage on its output.

The advantage of this type of a configuration is illustrated from a second example of MPP operation. This example is one to illustrate where one panel is shaded such that it can now only produce 0.5 amps. For the series connected string, the three panels producing 1 amp may completely reverse bias the panel making 0.5 amps causing the reverse diode to conduct. There may even be only power coming from three of the panels and this may total 300 watts. Again for an embodiment circuit of invention, each PC may be producing MPP totaling 350 watts. The voltage calculation would this time be:

$$3V+0.5V=400 \text{ volts}$$

In this instance, the three panels may have a voltage of 114.2 volts and the remaining one may have half as much, or 57.1 volts (thus presenting a variation of about 57.1 volts and a variation of about 2:1). (For a panel producing as low as the 15 volts mentioned above up to 114.2 volts, such would present a variation of about 99.2 volts and a variation of about 7.6:1). Output voltage can be seen as proportional to PV panel output power thus yielding a better result.

These are basic examples to illustrate some advantages. In an actual PV string today there may be many PV panels in series, and usually none of them make exactly the same power. Thus, many panels may become back biased and most may even produce less than their individual MPP. This can be overcome by embodiments of the present invention that utilize MPPT aspects. In FIG. 6 there is shown a power converter for taking power from a panel string and powering the grid. As discussed below, such configuration may need voltage limits and/or protection perhaps by setting operational boundaries.

A power conditioner (17) may be configured to always extract the maximum power from a PV panel. According to embodiments of the invention, this and other aspects may be accomplished by an impedance (or voltage) transformation capability provided through the power conditioner (17), the high efficiency photovoltaic DC-DC power converter (4), or the converter functionality control circuitry (8). These may include photovoltaic load impedance increase converter functionality control circuitry and photovoltaic load impedance decrease converter functionality control circuitry. Elements may act to change the high voltage, highly varying outputs and as such may include photovoltaic voltage increase converter functionality control circuitry, (and the step of providing, or perhaps feeding through, at least one photovoltaic voltage increase modality of photovoltaic DC-DC power conversion), as well as photovoltaic voltage decrease converter functionality control circuitry (and the step of providing, or perhaps feeding through, at least one photovoltaic voltage decrease modality of photovoltaic DC-DC power conversion perhaps responsive to the voltage increase modality). Such may act to transform the impedance or voltage of the individual or group power delivery as needed to maintain the MPP. The system may thus cause a variation in the voltage of each panel as it achieves maximum output for each. Based on topology of the system, this may be accomplished perhaps with a constant or common current so the series string is at maximum power. In embodiments, the invention may be configured to increase or decrease the load impedance or voltage for one panel and may even provide a fixed voltage if desired.

Figure 5:
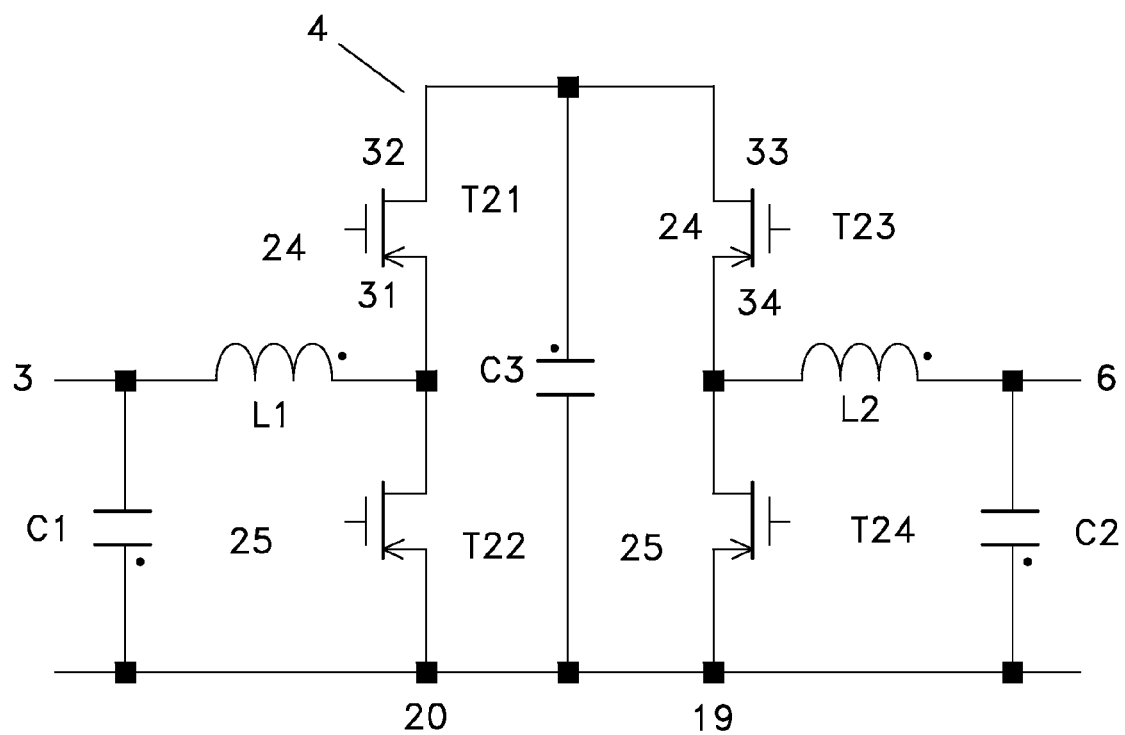
FIG. 5 shows one type of dual mode power conversion circuit such as might be used in embodiments of the invention.

As suggested above, a photovoltaic impedance or voltage transformation modality of photovoltaic DC-DC power conversion can be accomplished by photovoltaic impedance or voltage transformation power conversion control circuitry or by including elements such as: photovoltaic impedance increase photovoltaic DC-DC power conversion circuitry, photovoltaic impedance decrease photovoltaic DC-DC power conversion circuitry, photovoltaic voltage increase photovoltaic DC-DC power conversion circuitry, and/or photovoltaic voltage decrease photovoltaic DC-DC power conversion circuitry. A preferred embodiment of switching or switchmode photovoltaic impedance or voltage transformation photovoltaic DC-DC power converter is shown in FIG. 5. As may be appreciated, the switches included may be controlled by converter functionality control circuitry (8) for duty cycle switching, that is switching at periodic (even if not constant or if having varying periods) times to accomplish a variety of goals. This switching can occur in a variety of ways. There may also be variations in the method for switching from one mode to another. For example, if a minimum pulse width is set, it may be possible to further reduce the energy or alter the impedance or alter voltage by going to a burst mode as discussed below. If a minimum duty cycle is set to 2%, it is possible to get 0.2% energy transfer by using occasional bursts of the 2% duty cycle with a burst duty cycle of say 10%. Much of this may be achieved by frequency altered switching or other control of differing switches. Thus embodiments may provide switch frequency alteration switching photovoltaic power conversion control circuitry such as switch frequency alteration duty cycle switching photovoltaic power conversion control circuitry. This can give the possibility of a smooth transformation from one mode (such as a voltage or impedance change) to another while providing high efficiency during the transformation or conversion.

A goal in switching may include the maximum power point operation discussed above as well as a number of modalities as discussed below. Modalities of duty cycle and other control can be highly efficient and so embodiments can accomplish individually high efficiency conversion duty cycle controlling operation of the switch elements. Further, some of these modalities may even be slaved such that one takes precedence of one or another at some point in time, in some power regime, or perhaps based on some power parameter to achieve a variety of modalities of operation. These may include slaved maximum photovoltaic power point converter functionality control circuitry, slavedly individual panel dedicated maximum photovoltaic power point DC-DC converting, slaved photovoltaic inverter operating condition converter functionality control circuitry, slaved photovoltaic load impedance increase converter functionality control circuitry, slaved photovoltaic load impedance decrease converter functionality control circuitry, slaved photovoltaic voltage increase converter functionality control circuitry, and slaved photovoltaic voltage decrease converter functionality control circuitry. Again, some of these modalities are discussed later. In the context of impedance or voltage transformation or conversion, however, there may be photovoltaic impedance or voltage transformation duty cycle switching, and such may be controlled by photovoltaic impedance or voltage transformation duty cycle switch control circuitry (again understood as encompassing hardware, firmware, software, and even combinations of each).

With reference to the particular embodiments illustrated in FIG. 5, it may be understood that the high efficiency photovoltaic DC-DC power converter (4) may be operated to cause the photovoltaic impedance or voltage to increase or decrease. These two alternative modes of operation (increasing and decreasing) may even be exclusive in that either one or the other may exist at any point in time, even if such operations change over time. As such, embodiments may include photovoltaic impedance increase (or voltage increase, the effects are similar) photovoltaic DC-DC power conversion circuitry (19) and perhaps photovoltaic impedance decrease (or voltage decrease) photovoltaic DC-DC power conversion circuitry (20). Regardless of the mode employed, embodiments may accomplish alternating between a first modality of photovoltaic DC-DC power conversion and a second modality. Examples of a preferred circuit is illustrated in FIG. 5 where it can be considered that a first part (20) of the high efficiency photovoltaic DC-DC power converter (4) acts in one way (to increase impedance and increase voltage in FIG. 5) and a second part (19) of the high efficiency photovoltaic DC-DC power converter (4) acts in the other way (to decrease impedance and decrease voltage in FIG. 5). Thus it can be seen that modes of operation in the high efficiency photovoltaic DC-DC power converter (4) may be opposing in that one accomplishes an effect and the other accomplishes a contrary effect and that embodiments may include opposite modality photovoltaic DC-DC power conversion circuitries. Embodiments of the system may provide at least one photovoltaic impedance or voltage increase modality of photovoltaic DC-DC power conversion and at least one photovoltaic impedance or voltage decrease modality of photovoltaic DC-DC power conversion. As shown for the embodiment in FIG. 5, both of these modalities may be provided (or control achieved) in one high efficiency photovoltaic DC-DC power converter (4) so that the high efficiency photovoltaic DC-DC power converter (4) may achieve the steps of photovoltaic load impedance or voltage increasing and photovoltaic load impedance or voltage decreasing. These may occur during the same time or at differing times and may be slaved or not. At differing times, such elements may be considered disjunctive so that in alternative operation one operates when the other does not and visa versa. Such may also be substantially disjunctive so that for only power conversion insignificant periods do they both actually or appear to operate in similar timeframes. Thus the system may include substantially disjunctive impedance transformation photovoltaic power conversion control circuitry. Through the power conditioner (17) configuration and design the system may provide switching or other capability and, if applicable, control circuitry that may provide the desired effect. An aspect that may aid in the ability to achieve the unusually high efficiencies is the fact that the high efficiency photovoltaic DC-DC power converter (4) can be configured to increase voltage and then decrease voltage. As may be appreciated by a person of ordinary skill in the art, since the dominant losses can be resistance based, first increasing voltage can be understood for its beneficial effect relative to efficiency. For example, consider that when existing for a set level of power (such as that panel's then existing MPP), increasing voltage has the effect of decreasing current. From a basic perspective, resistance losses are mathematically expressed as $I^2R$. Thus the dominant loss can be considered as a function of current squared. By intermediately (or initially) decreasing current or equivalently increasing voltage, this loss can be minimized and the overall conversion operation can be accomplished more efficiently than for a converter that first decrease voltage and then increases it.

Referring again to the embodiment shown in FIG. 5, it can be seen that some embodiments may utilize one or more switches that may be controlled by photovoltaic switch control circuitry (23) and thus the power conditioner (17) may be of a switchmode character. In the embodiments shown, these switches are designated T21-T24. In some embodiments, these switches may be semiconductor switches and this may facilitate lower losses and higher efficiency. Furthermore, the switches and connections may be configured to provide one or more photovoltaic power series switch elements (24), perhaps dual or a first and second photovoltaic power interrupt switch elements (respectively T21 and T23), and dual or one or more photovoltaic power shunt switch elements (25), perhaps a first and second photovoltaic power shunt switch elements (respectively T22 and T24). As may be appreciated the photovoltaic power series switch elements (24) may be connected as shown and may provide one or more locations at which the transmission of photovoltaic power may be interrupted (the act of interrupting) and the photovoltaic power shunt switch elements (25) may be connected as shown and may provide one or more locations at which the transmission of photovoltaic power may be shunted (the act of shunting) to ground, another power path, or the like. As shown in FIG. 5, embodiments may have particular connection arrangements and may even include one or additional capacitances or capacitor elements. These may include a parallel capacitance, perhaps referred to as a common capacitor C3 connected as shown. In this particular embodiment, the first photovoltaic power interrupt switch element (T21) has a first input end (31) and a first output end (32) configured as shown. Similarly, the second photovoltaic power interrupt switch element (T23) has a second input end (33) and a second output end (34) configured as shown. Also included may be a first parallel capacitance (C1) and a first series inductance (L1) as well as a second parallel capacitance (C2) and a second series inductance (L2). The first series inductance (L1) may be connected to the first input end (31) of the first photovoltaic power interrupt switch element, and the first parallel capacitance (C1) may be connected to the input side of the first series inductance (L1). Similarly, the second series inductance (L2) may be connected to the second output end (34) of the second photovoltaic power interrupt switch element, and the second parallel capacitance (C2) may be connected to the output side of the second series inductance (L2).

As the illustration in FIG. 5 shows, embodiments may include not just one switch, not just one series and shunt switch, but even pairs of series pathed and shunt pathed semiconductor (or other) switches. Thus, the interrupting and the shunting can occur at least two separate semiconductor switch locations. Obviously, this example is configured to more simply illustrate each of the switching, interrupting, shunting, and pairing concepts, however, it should be understood that more complex configurations are possible. As with many circuitry aspects, some designs may even be arranged to elusively achieve the same effect; these would still fall within the scope of the present invention, of course.

As may be easily understood from the above, embodiments may accomplish high efficiency switching a first photovoltaic power interrupt switch element, high efficiency switching a second photovoltaic power interrupt switch element (perhaps connected as shown), high efficiency switching a first photovoltaic power shunt switch element, high efficiency switching a second photovoltaic power shunt switch element (perhaps connected as shown), capacitively storing parallel energy in a parallel capacitance (perhaps connected as shown), and high efficiency conversion duty cycle controlling operation of said first and second photovoltaic power interrupt switch elements and said first and second photovoltaic power shunt switch elements.

As may be appreciated from just the initially discussed modes of operation, namely, the modes of increasing and, perhaps alternatively, decreasing photovoltaic load impedance or voltage, systems according to embodiments of the present invention may provide a high efficiency photovoltaic DC-DC power converter (4) that serves as a multimodal photovoltaic DC-DC power converter perhaps controlled by multimodal converter functionality control circuitry (26) in that it has more than one mode of operation. These modes may include, but should be understood as not limited to, photovoltaic impedance or voltage increasing and photovoltaic impedance or voltage decreasing; several other modes are discussed below. In general, the aspect of multimodal activity encompasses at least processes where only one mode of conversion occurs at any one time. Impedance, or any other factor, may or may not be increased and then decreased in the same process regardless of the desired outcome. Only a single method of conversion is used, perhaps with a singular integration.

Thus, a power conditioner (17) may provide at least a first modality and second modality photovoltaic DC-DC power conversion circuitry, DC-DC power converter, or DC-DC power conversion. Further, as can be understood in an MPP context of increasing or decreasing photovoltaic load impedance, the multimodal photovoltaic DC-DC power converter or perhaps multimodal converter functionality control circuitry (26) may respond to one or more photovoltaic power condition, perhaps such as the V*I multiplicative factor, a voltage level, a current level, or some other perhaps signal indicated or calculated set point. In so offering the capability of more than one mode of conversion operation (even though not necessarily utilized at the same time), or in offering the capability of changing modes of operation, the system may accomplish the step of multimodally converting a DC photovoltaic input into a converted photovoltaic DC output. Similarly, by offering the capability of controlling to effect more than one mode of conversion operation (again, whether or not utilized at the same time), or in controlling to change modes of operation, the system may accomplish the step of multimodally controlling operation of a high efficiency photovoltaic DC-DC power converter (4).

Embodiments may include even two or more modes of operation and thus may be considered a dual mode power conversion circuit or dual mode converter. The dual mode nature of this circuit may embody a significant benefit and another distinction may be that most DC/DC converters are often intended to take an unregulated source and produce a regulated output. In this invention, the input to the DC/DC converter may be regulated to be at the PV panel MPP. The power taken from the PV panel may be transformed to whatever impedance or voltage is needed in the output connection to be able to satisfy the input MPP requirement even without regarding to output.

In the case of the impedance being changed such that the output voltage is lower than the input voltage, T21 can be forced to be in a continuous conduction state and T22 in a non-conducting state with T23 and T24 operated in a switchmode duty cycle state. This duty cycle of operation can be synchronous in that the transistor T24 may be switched synchronously with T23 (with inverted duty cycle). T24 may be a low $R_{DS(ON)}$ FET having much lower losses than a diode in this location. By such synchronous operation this circuit can have extremely high efficiency as mentioned more generally below. A concern can exist for this circuit in that current passes through an additional transistor, T21, but this transistor can have low loss as it is not switching.

Similarly, in the case of the impedance being changed such that the output voltage is higher than the input voltage, T23 can be forced to be in a continuous conduction state and T24 in a non-conducting state with T21 and T22 operated in a switchmode duty cycle state. This duty cycle of operation can be synchronous in that the transistor T22 may be switched synchronously with T21 (with inverted duty cycle). T22 may be a low $R_{DS(ON)}$ FET having much lower losses than a diode in this location. By such synchronous operation this circuit can have extremely high efficiency as mentioned more generally below. A concern can exist for this circuit in that current passes through an additional transistor, T23, but this transistor can have low loss as it is not switching. This, second mode (if exclusively operating) for the circuit shown in FIG. 5 shows that operation is possible where the impedance needs to be altered such that the output voltage is higher than the input voltage. As mentioned, now, T23 may be switched to a continuous conduction state. T24 may be non-conducting. Now transistors T21 and T22 may be controlled in a switchmode manner. One may see the same ideas apply. First, all switches are transistors having low on-state loss. Secondly the boost section may be operated with high efficiency with the only additional loss due to the dual mode capability in the on-state loss of transistor T23. This circuit can also make use of a parallel capacitance, perhaps referred to as a common capacitor C3 saving size, space and cost.

Interesting, and as also discussed below, while in prior art efficiency was sometimes shown to be less than 91%, this circuit accomplishes the needed DC-DC conversion function while operating even above 98% and at levels as high as 99.2% and even line loss efficiency. When connected to a solar panel or an array of solar panels this efficiency difference can be of paramount importance.

As mentioned briefly above, there may be alternating modes of operation and the system may vacillate (and achieve vacillatory conversion modes) between differing modes based upon a parameter or other indication or calculation. In embodiments where one mode or another is substantially exclusively activated, a power conditioner (17) or other system element may provide an alternative mode photovoltaic power converter functionality control (27). It may exclusively switch between modes at least some times. These modes may be modes of conversion and so the system may provide a vacillatory method of creating solar power. As indicated above, these modes may be opposing or opposing modalities, substantially disjunctive, or otherwise, and the system may include opposite modality photovoltaic DC-DC power conversion circuitries.

In exclusively controlling a particular operational mode, systems may disable an unused mode. This can be important, for example, to achieve the higher levels of efficiency mentioned below or the like. Referring to the examples illustrated in the context of photovoltaic impedance transformation in FIG. 5, it can be understood how embodiments of the invention can act to disable a mode of photovoltaic DC-DC power conversion perhaps through operation or control of the DC-DC converter, or operation at least some times and thus the system can provide disable alternative mode photovoltaic power conversion control circuitry (28). As discussed with respect to switch operation in the context of MPP, above, one or more switch(es), perhaps such as the photovoltaic power shunt switch element (25), one of the photovoltaic power series switch elements (24), or otherwise may be disabled during an operation. This may provide a capability to compare modes of operation or, perhaps most importantly, may permit highly efficient operation previously not believed achievable. Thus embodiments may provide photovoltaic disable mode converter functionality control circuitry.

Figure 7A:
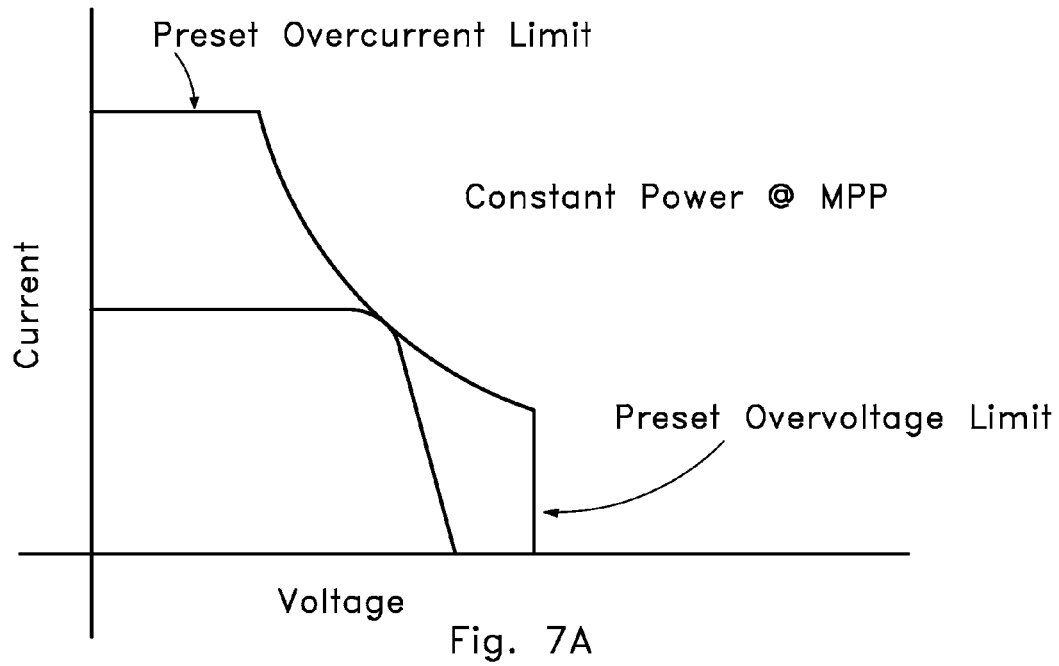
FIGS. 7A and 7B show plots of solar panel output operational conditions for differing temperatures and output paradigms.
Figure 7B:
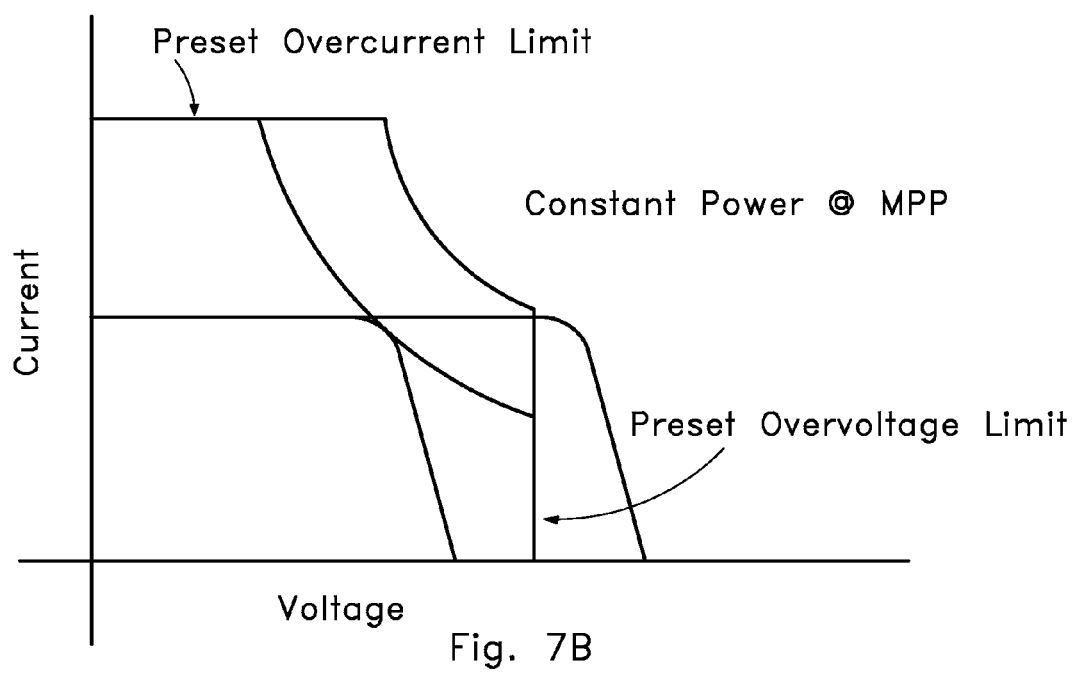
Figure 8:
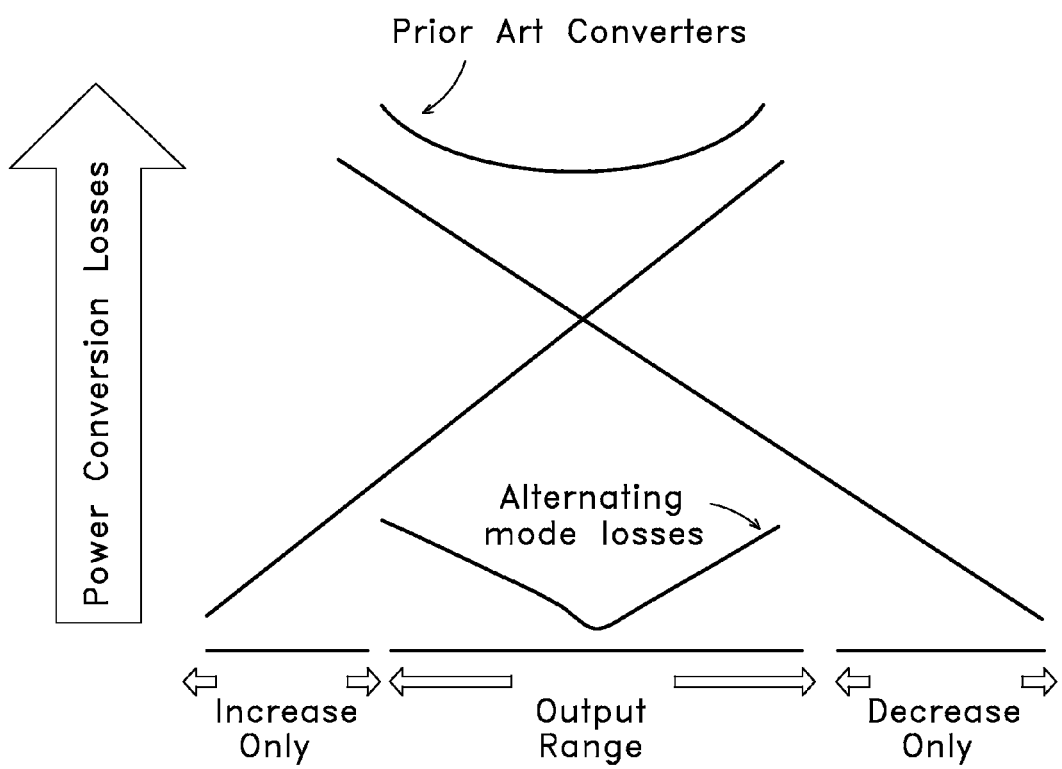
FIG. 8 shows a plot of losses by topology and range for traditional approach as compared to the present invention.

An aspect of operational capability that can afford advantage is the capability of embodiments of the invention to accommodate differing operating conditions for various solar sources or panels. As shown in FIGS. 7A and 7B, voltages of operation for maximum power point can vary based upon whether the solar source is experiencing hot or cold temperature conditions. By permitting MPP to be accommodated through impedance or voltage transformation apart from any voltage constraint, embodiments according to the invention may provide expansive panel capability. This may even be such that the converter is effectively a full photovoltaic temperature voltage operating range photovoltaic DC-DC power converter whereby it can operate at MPP voltages as high as that for the MPP in a cold temperature of operation as well as the MPP voltages as low as that for the MPP in a hot temperature of operation. Thus, as can be understood from FIGS. 7A and 7B, systems can provide solar energy source open circuit cold voltage determinative switching photovoltaic power conversion control circuitry and solar energy source maximum power point hot voltage determinative switching photovoltaic power conversion control circuitry. It can even achieve full photovoltaic temperature voltage operating range converting. This may be accomplished through proper operation of the switch duty cycles and systems may thus provide solar energy source open circuit cold voltage determinatively duty cycle switching and solar energy source maximum power point hot voltage determinatively duty cycle switching.

Further, viewing hot and cold voltages as perhaps the extreme conditions, similarly it can be understood how the system may accommodate varying amount of insulation and thus there may be provided insulation variable adaptive photovoltaic converter control circuitry that can extract MPP whether a panel is partially shaded, even if relative to an adjacent panel. Systems and their duty cycle switching may be adaptable to the amount of insulation and so the step of converting may be accomplished as insulation variably adaptively converting. This can be significant in newer technology panels such as cadmium-telluride solar panels and especially when combining outputs from a string of cadmium-telluride solar panels which can have broader operating voltages.

As mentioned earlier, an aspect of significant importance is the level of efficiency with which the converter operates. This is defined as the power going out after conversion over the power coming in before conversion. A portion of the efficiency gain is achieved by using switchmode operation of transistor switches, however, the topology is far more significant in this regard. Specifically, by the operation of switches and the like as discussed above, the system can go far beyond the levels of efficiency previously thought possible. Embodiments can include one or more substantially power isomorphic switchmode photovoltaic voltage (or impedance) converters. This can include the step of substantially power isomorphically converting. It can even provide a substantially power isomorphic photovoltaic DC-DC power conversion that does not substantially change the form of power into heat rather than electrical energy by providing as high as about 99.2% efficiency. This can be provided by utilizing substantially power isomorphic photovoltaic converter functionality, by substantially power isomorphic photovoltaic converter functionality control circuitry, and by a substantially power isomorphic photovoltaic impedance converter and by controlling operation of the switches so that there is limited loss as discussed above. Such operation can be at levels of from 97, 97.5, 98, 98.5 up to either 99.2 or essentially the wire transmission loss efficiency (which can be considered the highest possible). Thus embodiments may achieve high efficiency conversion duty cycle controlling of the operation of the switches, and may include 97% efficient photovoltaic conversion circuitry, 97.5% efficient photovoltaic conversion circuitry, 98% efficient photovoltaic conversion circuitry, 98.5% efficient photovoltaic conversion circuitry, 99.2% efficient photovoltaic conversion circuitry, and solar power converting with at least about 97% efficiency, solar power converting with at least about 97.5% efficiency, solar power converting with at least about 98% efficiency, solar power converting with at least about 98.5% efficiency, solar power converting with at least about 99.2% efficiency, and solar power converting up to about wire transmission loss efficiency.

One aspect that contributes to such efficiency is the fact that minimal amounts of energy are stored during the conversion process. As shown in FIG. 5, such embodiments may include one or more parallel capacitances and one or more series inductances. These may be used to store energy at least some times in the operation of converting. It may even be considered that full energy conversion is not accomplished, only the amount of conversion necessary to achieve the desired result. Thus embodiments may serve as a low energy storage photovoltaic DC-DC power converter and even a partial energy storage photovoltaic DC-DC power converter. In situations where the voltage in and the voltage out are nearly identical and thus the converter achieves unity conversion, there is even substantially no change in energy storage and so the system may have embodiments that are considered a substantially constant energy storage photovoltaic DC-DC power converter. Cycle-by-cycle energy storage may also be proportional (whether linearly, continuously, or not) to a voltage difference in conversion. Energy stored, perhaps in the inductor may also be proportional to a duty cycle for one or more switches. Part of the efficiency can also be considered as existing as a result of the fact that during operation some switches may remain static and either open or closed. Thus embodiments may provide static switch alternative mode photovoltaic power conversion control circuitry and similarly, static switch converting. It may also provide fractional switch element control circuitry.

Switches can be controlled in a variable duty cycle mode of operation such that frequency of switching alters to achieve the desired facet. The converter functionality control circuitry (8) may thus serve as photovoltaic duty cycle switch control circuitry. The duty cycle operations and switching can achieve a variety of results, from serving as photovoltaic impedance or voltage transformation (or increase or decrease) duty cycle switching, to other operations. Some of these may even be due to considerations apart from the conversion aspect that can be considered the primary purpose of the high efficiency photovoltaic DC-DC power converter (4).

While in theory or in normal operation the described circuits work fine, there can be additional requirements for a system to have practical function. For example the dual mode circuit as described could go to infinite output voltage if there were no load present. This situation can actually occur frequently. Consider the situation in the morning when the sun first strikes a PV panel string with power conditioners (17). There may be no grid connection at this point and the inverter section may not draw any power. In this case the power conditioner (17) might in practical terms increase its output voltage until the inverter would break. Rather than just dump this energy, the inverter could have overvoltage protection on its input adding additional power conversion components or, the power conditioner may simply have its own internal output voltage limit. For example if each power conditioner (17) could only produce 100 volts maximum and there was a string of ten PCs in series the maximum output voltage would be 1000 volts. This output voltage limit could make the grid-tied inverter less complex or costly and is illustrated in FIG. 7A as a preset overvoltage limit. Thus embodiments can present maximum voltage determinative switching photovoltaic power conversion control circuitry and maximum photovoltaic voltage determinative duty cycle switching (as shown in FIG. 7A as the preset overvoltage limit) or maximum voltage determinative duty cycle switching photovoltaic power conversion control circuitry. This can be inverter specific.

A maximum output current limit may also be useful and is illustrated in FIG. 7A as the preset overcurrent limit. This is less straightforward and is related to the nature of a PV panel. If a PV panel is subjected to insufficient light its output voltage may drop but its output current may not be capable of increasing. There can be an advantage to only allowing a small margin of additional current. For example, this same 100 watt panel which has a 100 volt maximum voltage limit could also have a 2 amp current limit without limiting its intended use. This may also greatly simplify the following grid tied inverter stage. Consider an inverter in a large installation which may need or use the more traditional approach of a crowbar shunt front end for protection. If the output of a PC could go to 100 amps the crowbar would have to handle impractical currents. This situation would not exist in a non PC environment as a simple PV panel string could be easily collapsed with a crowbar circuit. This current limit circuit may only be needed with a PC and it may be easily achieved by duty cycle or more precisely switch operation control. Once a current limit is included another BOS savings may be realized. Now the wire size for interconnect of the series string of PCs may be limited to only carry that maximum current limit. Here, slaved or not, embodiments can present maximum photovoltaic inverter current converter functionality control circuitry, photovoltaic inverter operating condition controlling the photovoltaic DC-DC converter, photovoltaic inverter maximum current determinative switching, photovoltaic inverter maximum current determinative duty cycle switching photovoltaic power conversion control circuitry, photovoltaic inverter maximum current determinative duty cycle switch control circuitry, maximum photovoltaic inverter current controlling the photovoltaic DC-DC converter, and photovoltaic inverter maximum current determinatively duty cycle switching or the like.

Similarly, embodiments can present maximum photovoltaic inverter voltage converter functionality control circuitry, photovoltaic inverter maximum voltage determinative switching, photovoltaic inverter maximum voltage determinative duty cycle switch control circuitry, maximum photovoltaic voltage determinative duty cycle switch control circuitry, and photovoltaic inverter maximum voltage determinatively duty cycle switching or the like.

One more system problem may also be addressed. In solar installations it may occur on rare conditions that a panel or field of panels may be subjected to more than full sun. This may happen when a refractory situation exists with clouds or other reflective surfaces. It may be that a PV source may generate as much as 1.5 times the rated power for a few minutes. The grid tied inverter section must either be able to operate at this higher power (adding cost) or must somehow avoid this power. A power limit in the PC may be the most effective way to solve this problem. In general, protection of some other element can be achieved by the converter. Embodiments can include aspects such as photovoltaic converter operating condition controlling the photovoltaic DC-DC converter. This may even be a posterior or downstream element such as the inverter and so the converter functionality control circuitry (8) may achieve controlling a posterior photovoltaic operating condition through control of the photovoltaic DC-DC converter, as well as protecting a posterior photovoltaic element through control of said photovoltaic DC-DC converter, and may serve to achieve photovoltaic inverter protection modality of photovoltaic DC-DC power conversion and may be considered as photovoltaic inverter protection converter functionality control circuitry. Beyond protection, desirable inverter or other operating conditions can be achieved by the converter, thus embodiments may include photovoltaic inverter operating condition converter functionality control circuitry or photovoltaic converter operating condition converter functionality control circuitry. These may be simply coordinated in some manner such as by a photovoltaic inverter or posterior photovoltaic or other element coordinated modality or photovoltaic inverter or posterior photovoltaic element coordinated converter functionality control circuitry, or posterior photovoltaic element protection converter functionality control circuitry. Embodiments may accomplish controlling said photovoltaic DC-DC converter to coordinate with characteristics of a photovoltaic inverter, slavedly controlling a photovoltaic conversion modality through said photovoltaic DC-DC converter, and photovoltaic inverter slavedly controlling a photovoltaic conversion modality through said photovoltaic DC-DC converter, to name a few possibilities. There may also be embodiments that have small output voltage (even within an allowed output voltage range). This may accommodate an inverter with a small energy storage capacitor. The output voltage may even be coordinated with an inverter's energy storage capability.

Figure 9:
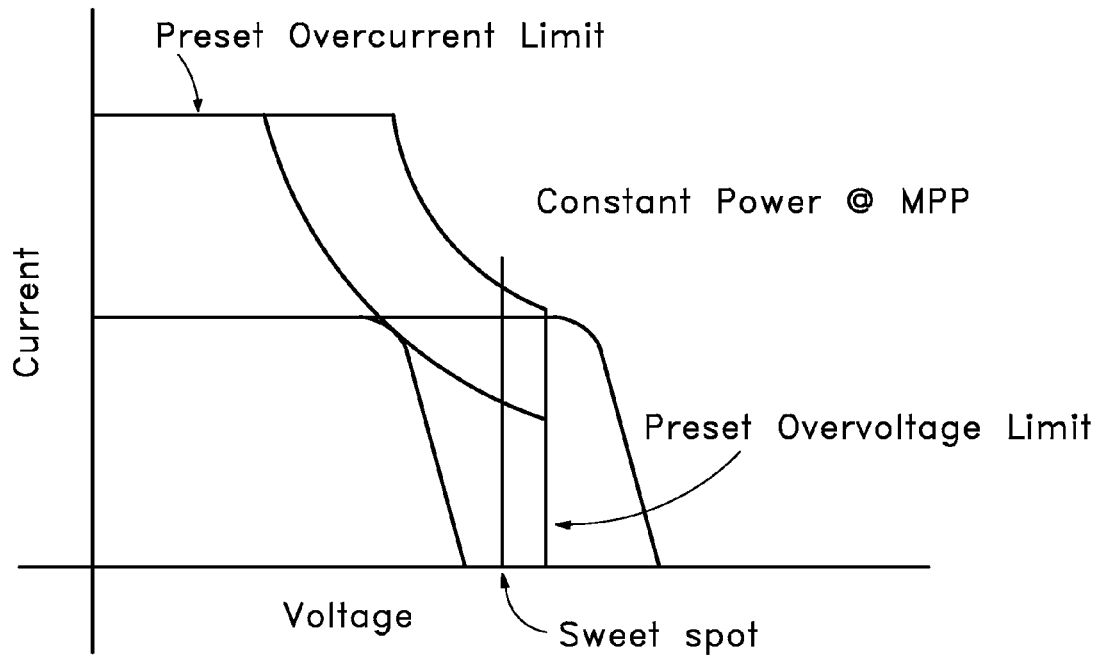
FIG. 9 shows a plot of combined protective and coordinated process conditions according to one operational embodiment of the invention.

As illustrated in FIGS. 7A, 7B, and 9, boundary conditions may be set such as the overcurrent limit and the overvoltage limit. Thus the converter and/or its control circuitry may serve as photovoltaic boundary condition converter functionality control circuitry, may achieve a photovoltaic boundary condition modality of photovoltaic DC-DC power conversion, and may accomplish the step of controlling a photovoltaic conversion boundary condition of the photovoltaic DC-DC converter, as well as photovoltaic boundary condition controlling of the switch elements.

Yet another mode of operation may be to make a value proportional (in its broadest sense) to some other aspect. For example, there can be advantages to making voltage proportional to current such as to provide soft start capability or the like. Thus embodiments may be configured for controlling a maximum photovoltaic output voltage proportional to a photovoltaic output current at least some times during the process of converting a DC input to a DC output. In general, this may provide soft transition photovoltaic power conversion control circuitry. And the system may include duty cycle control or switch operation that can be conducted so as to achieve one or more proportionalities between maximum voltage output and current output or the like. Further, not only can any of the above be combined with any other of the above, but each may be provided in a slaved manner such that consideration of one modality is secondary to that of another modality.

A variety of results have been described above. These may be achieved by simply altering the duty cycle of switches or by appropriately controlling the switches in some regard. These can be accomplished based on thresholds and so can provide threshold triggered alternative mode, threshold determinative, threshold activation, or threshold deactivation switching photovoltaic power conversion control circuitry. Naturally, these may include threshold determinative duty cycle switching photovoltaic power conversion control circuitry, threshold determinative mode deactivation duty cycle switching photovoltaic power conversion control circuitry, as well as threshold determinative mode activation duty cycle switching photovoltaic power conversion control circuitry. A burst mode of operation perhaps such as when nearing a mode alteration level of operation may be provided and at such times frequency can be halved, opposing modes can be both alternated, and levels can be reduced as a change becomes incipient. Such can be provided by burst mode duty cycle switching photovoltaic power conversion control circuitry. This can be transient as well. In these manners burst mode switching photovoltaic power conversion control circuitry and burst mode switching can be accomplished, as well as transient opposition mode photovoltaic duty cycle switch control circuitry, transiently operated opposite modality photovoltaic DC-DC power conversion circuitries, and the step of transiently establishing opposing switching modes.

As mentioned above, the PCs and high efficiency photovoltaic DC-DC power converters (4) may handle individual panels. They may be attached to a panel, to a frame, or separate. Embodiments may have converters physically integral to such panels in the sense that they are provided as one attached unit for ultimate installation. This can be desirable such as when there are independent operating conditions for separate solar sources, and even adjacent solar sources to accommodate variations in insulation, condition, or otherwise. Each panel or the like may achieve its own MPP, and may coordinate protection with all others in a string or the like.

Figure 10:
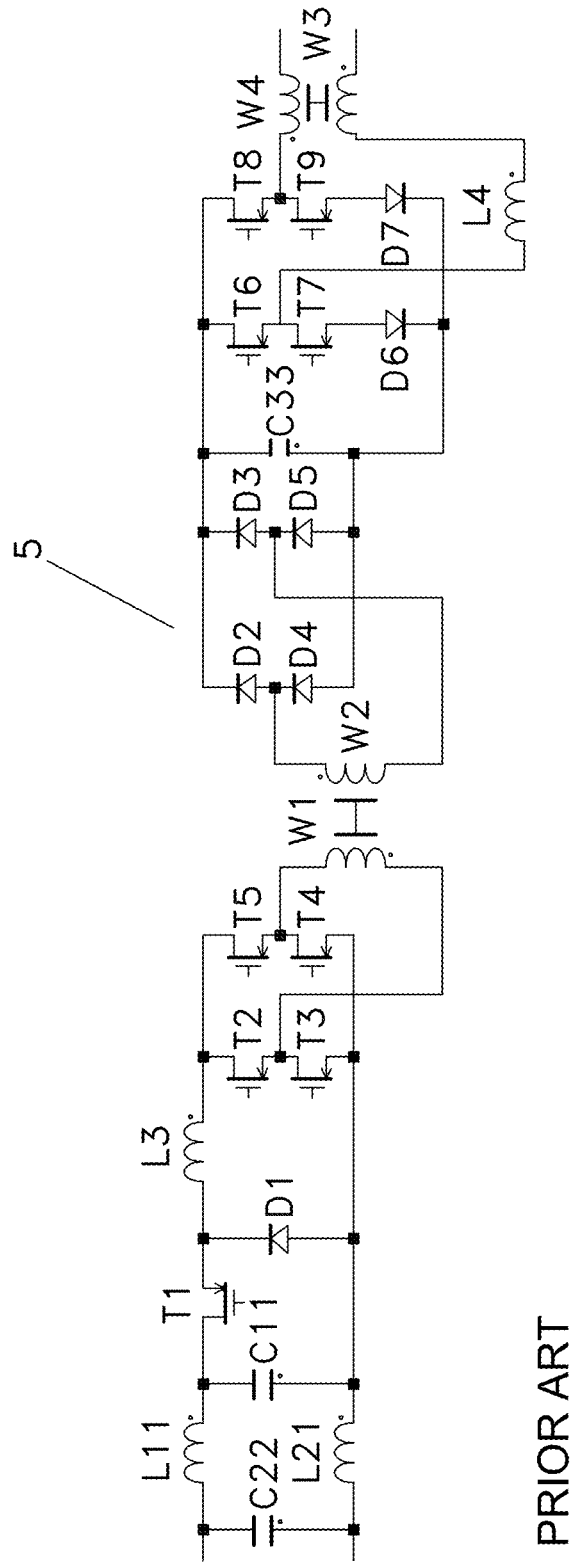
FIG. 10 shows a prior art system with a traditional grid-tied inverter.

FIG. 10 illustrates one type of traditional photovoltaic DC-AC inverter (5) that may be used. Naturally as may be appreciated from the earlier comments enhanced inverters that need not control MPP and that are alternatively protected by the converter may be used. Inverters may even have a separate control input so that the input voltage is at a most optimal level, perhaps such as a singular sweet spot or the like as illustrated by the bold vertical line in FIG. 9. Although other inventions by the present assignee address such aspects, they may be considered incidental to the converter invention described here. Thus a traditional inverter is shown in FIG. 10. This may merely provide a connection to some type of AC power grid interface (9).

As the invention becomes more accepted it may be advantageous to permit comparison with more traditional technologies. This can be achieved by simple switch operation whereby traditional modes of operation can be duplicated or perhaps adequately mimicked. Thus embodiments may include a solar power conversion comparator (29) that can compare first and second modes of operation, perhaps the improved mode of an embodiment of the present invention and a traditional, less efficient mode. This comparator may involve indicating some solar energy parameter for each. In this regard, the shunt switch operation disable element may be helpful. From this a variety of differences can be indicated, perhaps: solar power output differences, solar power efficiency differences, solar power cost differences, solar power insulation utilization comparisons, and the like.

By the above combinations of these concepts and circuitry, at least some of the following benefits may be realized:

Every PV panel may produce its individual maximum power. Many estimates today indicate this may increase the power generated in a PV installation by 20% or even more.

The grid tied inverter may be greatly simplified and operate more efficiently.

The photovoltaic DC-DC converter may be greatly simplified and operate more efficiently.

The Balance of System costs for a PV installation may be reduced.

The circuitry, concepts and methods of various embodiments of the invention may be broadly applied. It may be that one or more PCs per panel may be used. For example there may be non-uniformities on a single panel or other reasons for harvesting power from even portions of a panel. It may be for example that small power converters may be used on panel segments optimizing the power which may be extracted from a panel. This invention is explicitly stated to include sub panel applications.

This invention may be optimally applied to strings of panels. It may be more economical for example to simply use of a PC for each string of panels in a larger installation. This could be particularly beneficial in parallel connected strings if one string was not able to produce much power into the voltage the remainder of the strings is producing. In this case one PC per string may increase the power harvested from a large installation.

This invention is assumed to include many physical installation options. For example there may be a hard physical connection between the PC and a panel. There may be an interconnection box for strings in which a PC per string may be installed. A given panel may have one or more PCs incorporated into the panel. A PC or converter may also be a stand-alone physical entity.

All of the foregoing is discussed in the context of a solar power application. As may be appreciated, some if not all aspects may be applied in other contexts as well. Thus, this disclosure should be understood as supporting other applications of the converter regardless how applied and even whether applied as a power converter, impedance converter, voltage converter, or otherwise.

As can be easily understood from the foregoing, the basic concepts of the present invention may be embodied in a variety of ways. It involves both solar power generation techniques as well as devices to accomplish the appropriate power generation. In this application, the power generation techniques are disclosed as part of the results shown to be achieved by the various circuits and devices described and as steps which are inherent to utilization. They are simply the natural result of utilizing the devices and circuits as intended and described. In addition, while some circuits are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the devices and circuits described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, claims set forth in each priority case, claims supported by each reference incorporated, and the broad methods or processes and the like are encompassed by this disclosure and may be relied upon when drafting claims for any subsequent patent application. It should be understood that such language changes and broader or more detailed claiming may be accomplished at a later date. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting" or achieving a "conversion"—whether explicitly discussed or not—and, conversely, were there effectively disclosure of the act of "converting" or a "conversion", such a disclosure should be understood to encompass disclosure of a "converter" and even a "means for converting" Such changes and alternative terms are to be understood to be explicitly included in the description.

Any patents, publications, or other references mentioned in this application for patent or its list of references are hereby incorporated by reference in each of their entireties. Any priority case(s) claimed at any time by this or any subsequent application are hereby appended and hereby incorporated by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the List of References other information statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the converters as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein. In addition and as to computerized aspects and each aspect amenable to programming or other programmable electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden or to meet prosecution rules, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. Both the examiner and any person otherwise interested in existing or later potential coverage, or considering if there has at any time been any possibility of an indication of disclaimer or surrender of potential coverage, should be aware that in the absence of explicit statements, no such surrender or disclaimer is intended or should be considered as existing in this or any subsequent application. Limitations such as arose in *Hakim v. Cannon Avent Group, PLC*, 479 F.3d 1313 (Fed. Cir 2007), or the like are expressly not intended in this or any subsequent related matter.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of solar energy power inversion comprising the steps of:
    establishing a plurality of solar panels;
    creating a highly varying DC photovoltaic output from each of said plurality of solar panels;
    individually establishing each said highly varying DC photovoltaic output as an individual DC photovoltaic input to an individual inverter operating condition modality coordinated photovoltaic DC-DC converter; thereby establishing a plurality of DC-DC converters;
    individually, by said DC-DC converters, inverter operating condition coordinating conversion of each said individual DC photovoltaic input into a converted DC photovoltaic output for a high voltage, high power photovoltaic DC-AC inverter;
    serially connecting a plurality of said converted DC photovoltaic outputs to create a combined higher voltage converted DC photovoltaic output;
    establishing said combined higher voltage converted DC photovoltaic output as a converted DC photovoltaic input to said high voltage, high power photovoltaic DC-AC inverter; and
    inputting said converted DC photovoltaic input at a coordinated inverter operating condition of said high voltage, high power photovoltaic DC-AC inverter.

2. A method of solar energy power inversion as described in claim 1 further comprising the step of maximum photovoltaic power point controlling each said individual inverter operating condition coordinated photovoltaic DC-DC converter.

3. A method of solar energy power inversion comprising the steps of:
    establishing at least one solar energy source;
    creating a highly varying DC photovoltaic output from said at least one solar energy source;
    establishing said highly varying DC photovoltaic output as a DC photovoltaic input to a photovoltaic DC-DC converter;
    inverter operating condition coordinating conversion of said DC photovoltaic input into a converted DC photovoltaic output for a high power photovoltaic DC-AC inverter, by said DC-DC converter;
    establishing said converted DC photovoltaic output as a converted DC photovoltaic input to said high power photovoltaic DC-AC inverter; and
    inverting said converted DC photovoltaic input into a high power inverted AC photovoltaic output.

4. A method of solar energy power inversion as described in claim 3, wherein said step of inverter operating condition coordinating conversion of said DC photovoltaic input into a converted DC photovoltaic output for a high power photovoltaic DC-AC inverter comprises the step of controlling said photovoltaic DC-DC converter with said high power photovoltaic DC-AC inverter.

5. A method of solar energy power inversion as described in claim 3, wherein said step of inverter operating condition coordinating conversion of said DC photovoltaic input into a converted DC photovoltaic output for a high power photovoltaic DC-AC inverter comprises the step of achieving a desired inverter operating condition.

6. A method of solar energy power inversion as described in claim 5 wherein said step of achieving a desired inverter operating condition comprises the step of achieving a desired inverter operating condition selected from the group consisting of:
- achieving slaved photovoltaic inverter operating condition converter functionality;
- achieving maximum photovoltaic inverter current converter functionality;
- achieving photovoltaic inverter operating condition controlling said photovoltaic DC-DC converter;
- achieving photovoltaic inverter maximum current determinative switching;
- achieving photovoltaic inverter maximum current determinative duty cycle switching photovoltaic power conversion;
- achieving inverter maximum current determinative duty cycle switching;
- achieving maximum photovoltaic inverter current controlling said photovoltaic DC-DC converter;
- achieving maximum photovoltaic inverter voltage converter functionality;
- achieving photovoltaic inverter maximum voltage determinative switching;
- achieving photovoltaic inverter maximum voltage determinative duty cycle switching;
- achieving controlling a posterior photovoltaic operating condition through control of said photovoltaic DC-DC converter;
- achieving protecting a posterior photovoltaic element through control of said photovoltaic DC-DC converter;
- achieving photovoltaic inverter protection modality of photovoltaic DC-DC power conversion;
- achieving photovoltaic posterior photovoltaic element coordinated converter functionality;
- achieving posterior photovoltaic element protection converter functionality;
- achieving controlling said photovoltaic DC-DC converter to coordinate with characteristics of a photovoltaic inverter; and
- achieving photovoltaic inverter slavedly controlling a photovoltaic conversion modality through said photovoltaic DC-DC converter.

7. A method of solar energy power inversion as described in claim 5 wherein said step of achieving a desired inverter operating condition comprises the step of achieving singular input to said high power photovoltaic DC-AC inverter.

8. A method of solar energy power inversion as described in claim 7 wherein said step of achieving singular input to said high power photovoltaic DC-AC inverter comprises the step of achieving sweet spot input to said high power photovoltaic DC-AC inverter.

9. A method of solar energy power inversion as described in claim 5 wherein said step of achieving a desired inverter operating condition comprises the step of achieving a desired inverter operating condition with converter functionality control circuitry.

10. A method of solar energy power inversion as described in claim 5 wherein said step of achieving a desired inverter operating condition comprises the step of achieving a desired inverter operating condition remote from said high power photovoltaic DC-AC inverter.

11. A method of solar energy power inversion as described in claim 5 wherein said step of achieving a desired inverter operating condition comprises the step of achieving a desired inverter operating condition at said photovoltaic DC-DC converter.

12. A method of solar energy power inversion as described in claim 5 wherein said step of achieving a desired inverter operating condition comprises the step of utilizing an inverter control input.

13. A method of solar energy power inversion as described in claim 12 wherein said step of utilizing an inverter control input comprises the step of coordinating input to said high power photovoltaic DC-AC inverter with a functionality of said photovoltaic DC-DC converter.

14. A method of solar energy power inversion as described in claim 12 wherein said step of utilizing an inverter control input comprises the step of accomplishing singular input to said high power photovoltaic DC-AC inverter.

15. A method of solar energy power inversion as described in claim 12 wherein said step of utilizing an inverter control input comprises the step of accomplishing sweet spot input to said high power photovoltaic DC-AC inverter.

16. A method of solar energy power inversion as described in claim 5 wherein said step of achieving a desired inverter operating condition comprises the step of achieving inverter-specific operation of said photovoltaic DC-DC converter.

17. A method of solar energy power inversion as described in claim 3 further comprising the step of maximum photovoltaic power point controlling said photovoltaic DC-DC converter.

18. A method of solar energy power inversion as described in claim 3 wherein:
- said step of establishing at least one solar energy source comprises the step of establishing a plurality of solar energy sources;
- said step of creating a highly varying DC photovoltaic output from said at least one solar energy source comprises the step of creating a highly varying DC photovoltaic output from each of said plurality of solar energy sources;
- said step of establishing said highly varying DC photovoltaic output as a DC photovoltaic input to a photovoltaic DC-DC converter comprises the step of individually establishing each said highly varying DC photovoltaic output as an individual DC photovoltaic input to an individual photovoltaic DC-DC converter;
- said step of inverter operating condition coordinating conversion of said DC photovoltaic input into a converted DC photovoltaic output for a high power photovoltaic DC-AC inverter comprises the step of individually inverter operating condition coordinating conversion of each said individual DC photovoltaic input into a converted DC photovoltaic output;
- said step of establishing said converted DC photovoltaic output as a converted DC photovoltaic input to said high power photovoltaic DC-AC inverter comprises the step of establishing a plurality of said converted DC photovoltaic outputs as a converted DC photovoltaic input to a high voltage, high power photovoltaic DC-AC inverter; and said step of inverting said converted DC photovoltaic input into a high power inverted AC photovoltaic output comprises the step of inverting said converted DC photovoltaic input into a high voltage, high power inverted AC photovoltaic output.

19. A method of solar energy power inversion as described in claim 18 further comprising the step of serially connecting said plurality of converted DC photovoltaic outputs to create a combined higher voltage converted DC photovoltaic output, and wherein said step of establishing a plurality of said converted DC photovoltaic outputs as a converted DC photovoltaic input to said high voltage, high power photovoltaic DC-AC inverter comprises the step of establishing said combined higher voltage converted DC photovoltaic output as a converted DC photovoltaic input to said high voltage, high power photovoltaic DC-AC inverter.

* * * * *